(12) United States Patent
Ishizumi et al.

(10) Patent No.: US 8,373,640 B2
(45) Date of Patent: Feb. 12, 2013

(54) DISPLAY DEVICE

(75) Inventors: Takashi Ishizumi, Nara (JP); Yoshihiro Izumi, Kashihara (JP); Yasukuni Yamane, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 938 days.

(21) Appl. No.: 11/988,229

(22) PCT Filed: May 19, 2006

(86) PCT No.: PCT/JP2006/310056
§ 371 (c)(1),
(2), (4) Date: Jan. 3, 2008

(87) PCT Pub. No.: WO2007/007472
PCT Pub. Date: Jan. 18, 2007

(65) Prior Publication Data
US 2009/0040171 A1 Feb. 12, 2009

(30) Foreign Application Priority Data
Jul. 7, 2005 (JP) ................................. 2005-199298

(51) Int. Cl.
*G09G 3/36* (2006.01)
(52) U.S. Cl. ............ 345/102; 345/45; 345/55; 345/74.1
(58) Field of Classification Search .............. 345/45–48, 345/55, 102
See application file for complete search history.

(56) References Cited

U.S. PATENT DOCUMENTS
5,646,702 A 7/1997 Akinwande et al.
(Continued)

FOREIGN PATENT DOCUMENTS
EP 1 424 714 6/2004
EP 1 485 904 12/2004
(Continued)

OTHER PUBLICATIONS

Y. Takeuchi et al., "Novel Display Panel Utilizing Field Effect—Ferroelectric Electron Emitters" Proceedings of the 11th International Display Workshops (IDW '04), pp. 1193-1196, Dec. 8, 2004.
Japanese Office Action dated Feb. 15, 2011 issued in corresponding Japanese Application No. 2007-524536 and English translation thereof.

*Primary Examiner* — Viet Pham
(74) *Attorney, Agent, or Firm* — Harness, Dickey & Pierce, P.L.C.

(57) ABSTRACT

In one embodiment of the present invention, a display device is disclosed which performs a divided-screen active driving, and which allows (i) its emitting region to be divided into smaller units, irrespective of the smallest module unit of a light source; and (ii) minimizing increase in costs for a driving system and manufacturing of an area light source, a display device of the present invention includes: a display panel having unit display pixels; an area light source arranged on a back surface of the display panel, the area light source having an emitting region which is divided into divided emitting regions; and a controlling section for controlling luminance of each of the divided emitting regions of the area light source, based on luminance information of video signals input, wherein the area light source includes: unit emitting pixels which controls light emission of the divided emitting regions through a matrix driving; the unit emitting pixels each having an electron emitting element for emitting an electron, and a fluorescent substance which emits light by being excited by the electron emitted from the electron emitting element, the unit emitting pixels each occupying an area which is equivalent to an area of plural pixels out of the unit display pixels.

5 Claims, 10 Drawing Sheets

U.S. PATENT DOCUMENTS

| | | | |
|---|---|---|---|
| 6,031,328 A * | 2/2000 | Nakamoto | 313/495 |
| 6,268,843 B1 | 7/2001 | Arakawa | |
| 2003/0122771 A1 | 7/2003 | Sumiyoshi et al. | |
| 2004/0104669 A1 | 6/2004 | Takeuchi et al. | |
| 2004/0104684 A1 | 6/2004 | Takeuchi et al. | |
| 2004/0104688 A1 | 6/2004 | Takeuchi et al. | |
| 2004/0104689 A1 | 6/2004 | Takeuchi et al. | |
| 2004/0104690 A1 | 6/2004 | Takeuchi et al. | |
| 2004/0113561 A1 | 6/2004 | Takeuchi et al. | |
| 2004/0135438 A1 | 7/2004 | Takeuchi et al. | |
| 2005/0012104 A1* | 1/2005 | Hori et al. | 257/79 |
| 2005/0052388 A1* | 3/2005 | Handschy et al. | 345/89 |
| 2005/0062400 A1 | 3/2005 | Takeuchi et al. | |
| 2005/0162737 A1* | 7/2005 | Whitehead et al. | 359/454 |
| 2006/0125767 A1* | 6/2006 | Kang et al. | 345/102 |
| 2006/0209000 A1 | 9/2006 | Sumiyoshi et al. | |
| 2009/0251641 A1 | 10/2009 | Sumiyoshi et al. | |

FOREIGN PATENT DOCUMENTS

| | | |
|---|---|---|
| JP | 3-71111 | 3/1991 |
| JP | 10-148829 | 6/1998 |
| JP | 10-508120 | 8/1998 |
| JP | 2000-321571 | 11/2000 |
| JP | 2002-099250 | 4/2002 |
| JP | 2003-131224 | 5/2003 |
| JP | 2004-228062 | 8/2004 |
| JP | 2004-350179 | 12/2004 |
| JP | 2005-070690 | 3/2005 |
| JP | 2005-520188 | 7/2005 |
| WO | WO 03/077013 | 9/2003 |
| WO | WO 03077013 A2 * | 9/2003 |

* cited by examiner

PIXEL LAYOUT OF LIQUID CRYSTAL PANEL

UNIT DISPLAY PIXELS
L(m,n)

DIVISION PATTERN OF EMITTING REGION

M(p", q")

PIXEL LAYOUT OF AREA LIGHT SOURCE

40

N(j", k")

F I G. 10
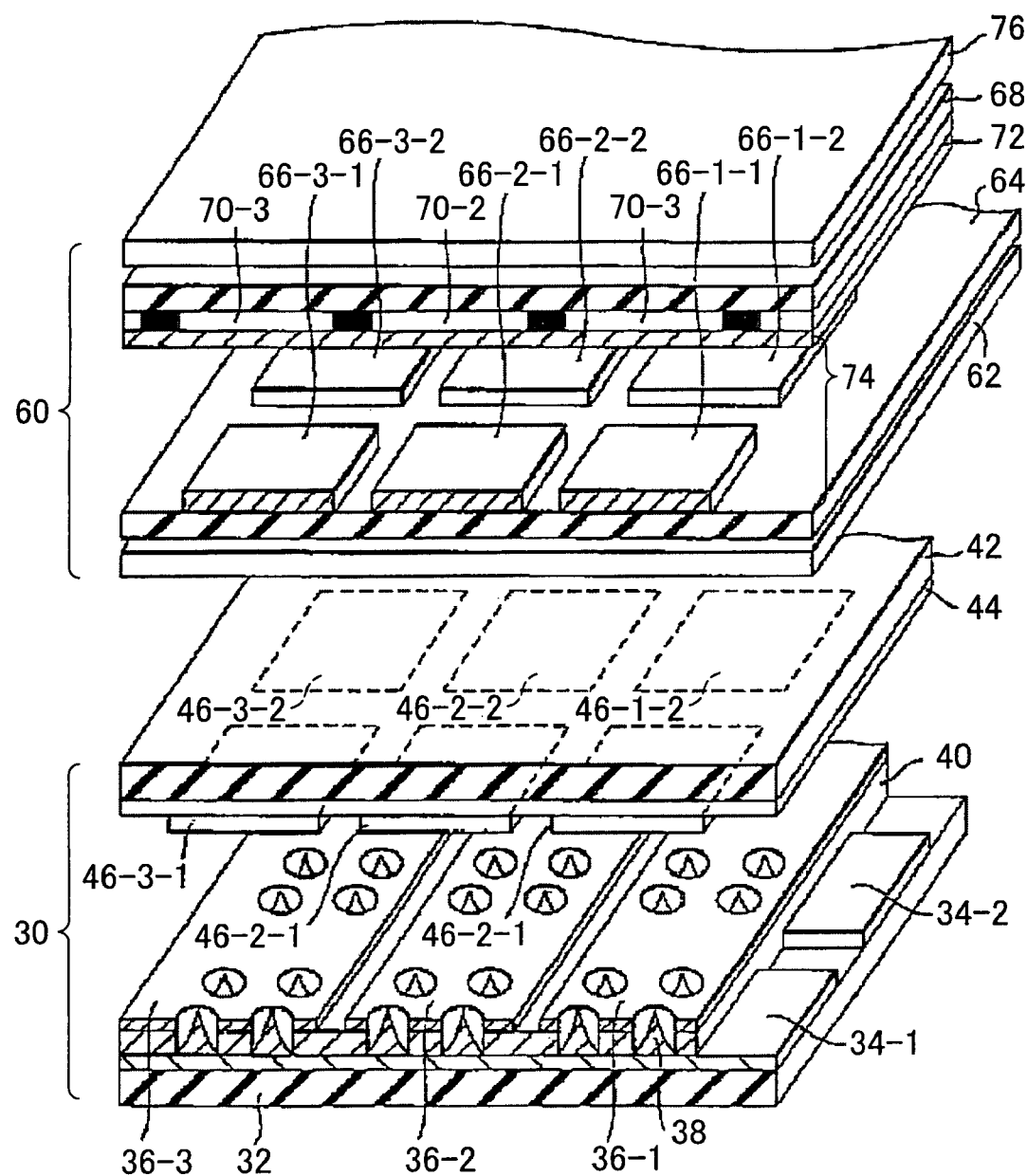

DISPLAY DEVICE

TECHNICAL FIELD

The present invention relates to a display device, particularly to a display device which displays an image by using a display panel and a backlight (backlight source).

BACKGROUND ART

Liquid crystal display devices (LCDs) have been used as display devices in many occasions in recent years. Amongst those, active-matrix-driven LCDs having a thin film transistor for each pixel are widely used in flat-screen television sets, laptop computers, monitors of desktop computers, and the like, because of their low thickness and light weight, and their characteristics such as low-power consumption, high resolution, and high contrast.

The configuration of each active-matrix-driven LCD used today includes a liquid crystal panel (display panel) and a backlight. The liquid crystal panel which includes two glass substrates interposing therebetween liquid crystal has a color filter. On the back surface of this liquid crystal panel, the backlight is provided.

In many cases, the backlight adopted in the active-matrix-driven LCD is a fluorescent lamp (cold-cathode tube) of several mm in diameter, which lamp has a shape of a straight pipe or U-shaped pipe or the like. The fluorescent lamp can be adopted to a "direct method" in which a fluorescent lamp is arranged directly at the back of the liquid crystal panel, or to an area light source adopting an "edge light method" in which a fluorescent lamp is arranged on an edge of an optical waveguide, and light from the fluorescent lamp is delivered to the back surface of the liquid crystal panel via the optical waveguide. Further, in recent years, LEDs are increasingly used as backlight in place of fluorescent lamps.

For example, Patent Document 1 discloses a liquid crystal display device adopting, as a backlight, an FED (Field Emission Display) having emitting pixels corresponding to display pixels of a liquid crystal panel on a one-to-one basis (see FIG. 10).

Meanwhile, it is believed that a liquid crystal display device does not achieve the displaying performance of a CRT in terms of dynamic range of displaying. In view of this, the following technology has been conventionally suggested. Namely, in the art, the luminance of a backlight which is constant in terms of time is varied according to video information, so as to expand the dynamic range of displaying.

Examples of such a technologies are disclosed in Patent Documents 2, 3, or 4. In these disclosed technologies, a backlight is divided into plural emitting regions (illuminating regions) forming a matrix of N×M. For each of the illuminating regions, optimum luminance according to video information is calculated, and the backlight luminance control and image processing based on a video signal are performed for each of the emitting regions. This technology is hereinafter referred to as divided-screen active backlight driving.

As described, the luminance of each emitting region of the backlight is suitably varied based on video information of a corresponding piece of a divided image, thereby displaying the video with a high dynamic range.

However, the technology of Patent Document 1 and the divided-screen active backlight driving disclosed in Patent Documents 2 to 4 have the following problems.

First, when the divided-screen active backlight driving of Patent Documents 2 to 4 is performed in a liquid crystal display device, the arrangement and shape of light sources used in a backlight will restrict the freedom in patterning the backlight into emitting regions.

For example, in cases where fluorescent lamps are used in a backlight as is described in Patent Document 4, straight pipes or U-shaped pipes of several nm in diameter needs to be arranged at a predetermined interval. Accordingly, the number of emitting regions and their shapes are largely dependent on the shapes and arrangement of the fluorescent lamps.

Further, the smallest module of a light source (e.g. fluorescent lamp, LED) defines the smallest emission unit of a division pattern of the emitting regions in the backlight. As such, it is not possible to further divide the light emitting regions into smaller regions than the smallest emission unit.

On the other hand, as described in Patent Document 1, using, as a backlight, an FED having unit emitting pixels corresponding to display pixels of a liquid crystal panel on a one-to-one basis will necessitate that the resolution of the FED be the same as that of the liquid crystal panel (i.e., that the FED have the same number of pixels as the liquid crystal panel). This increases the cost for manufacturing the FED and the cost for a driving system therefor.

Patent Document 1: Japanese Unexamined Patent Publication No. 148829/1998 (Tokukaihei 10-148829; Published on Jun. 2, 1998)

Patent Document 2: Japanese Unexamined Patent Publication No. 99250/2002 (Tokukai 2002-99250; Published on Apr. 5, 2002)

Patent Document 3: Japanese Unexamined Patent Publication No. 350179/2004 (Tokukai 2004-350179; Published on Dec. 9, 2004)

Patent Document 4: Japanese Unexamined Patent Publication No. 321571/2000 (Tokukai 2000-321571; Published on Nov. 24, 2000)

Patent Document 5: Japanese Unexamined Patent Publication No. 228062/2004 (Tokukai 2004-228062; Published on Aug. 12, 2004)

Non-Patent Document 1: Y. Takeuchi, T. Nanataki, I. Ohwada, "Novel Display Panel Utilizing Field Effect—Ferroelectric Electron Emitters", Proceedings of the 11th International Display Workshops (IDW'04), pp. 1193-1196 (2004), Published on Dec. 8, 2004

DISCLOSURE OF INVENTION

The present invention was made to solve the foregoing problems, and it is an object of the present invention to provide a display device which displays an image by using a display panel and a backlight (backlight source), and which device, in cases where the emitting regions of the backlight is divided and divided-screen active driving is performed, allows: (i) division of emitting regions into smaller units irrespective of a size of the smallest module unit of a light source used as the backlight, and (ii) minimizing increases in the costs for a driving system and manufacturing of the backlight.

In order to solve the foregoing problems, a display device of the present invention includes: a display panel on which plural unit display pixels are aligned; an area light source arranged on a back surface of the display panel, the area light source having an emitting region which is divided into plural divided emitting regions; and a controlling section for controlling luminance of each of the divided emitting regions of the area light source, based on luminance information of a video signal input, the area light source including plural unit emitting pixels which control light emission of the divided emitting regions through a matrix driving, the unit emitting pixels each including an electron emitting element for emitting an electron, and a fluorescent substance which emits light by being excited by the electron emitted from the electron emitting element, and the unit emitting pixels each occupying an area which is equivalent to an area occupied by plural pixels out of the plural unit display pixels.

The display device of the present invention performs displaying by using a display panel having a display screen and an area light source arranged on the back surface of the display panel. With this display device, displaying is performed by having light emitted from the area light source pass through the display panel.

Further, the emitting region of the area light source are divided into plural divided emitting regions. The controlling section is for individually controlling luminance of each of the divided emitting regions of the area light source, based on the luminance information of the video signal input. Therefore, for a part of the entire display screen of the display panel 1, which part is overall fed with relatively high (bright) luminance image information, the luminance of the area light source is increased according to the luminance information. On the contrary, for a part of the entire display screen of the display panel 1, which part is overall fed with relatively low (dark) luminance image information, the luminance of the area light source is decreased according to the luminance information. As a result, the dynamic range of the entire display screen is expanded.

Further, in the configuration, the area light source has plural unit emitting pixels. These unit emitting pixels control light emission of divided emitting regions by being subjected to a matrix driving. That is, in the above configuration, luminance information of the area light source controlled by the controlling section is input to each of the unit emitting pixels. Then, each of the unit emitting pixels controls the associated one of the divided emitting regions, based on the input luminance information of the area light source.

Further, each of the unit emitting pixels includes the electron emitting element for emitting an electron, and the fluorescent substance which emits light by being excited by the electron emitted from the electron emitting element. In other words, luminance information of the area light source controlled by the controlling section is input to each of the unit emitting pixels (voltage is applied). Then, in each of the unit emitting pixels, an electron is emitted from the electron emitting element. The electron hits the fluorescent substance. When the electron hits the fluorescent substance, the fluorescent substance is excited and emits light.

A conventional liquid crystal display device (liquid crystal display device described in Patent document 1) adopts, as its backlight, a member having emitting pixels corresponding to display pixels of a liquid crystal panel on a one-to-one basis. This necessitates that the resolution of the area light source be as high as that of the liquid crystal panel. Therefore, an area light source of this liquid crystal display device has been difficult to manufacture. The liquid crystal display device also causes an increase in the costs for a driving system.

However, with the configuration, each of the unit emitting pixels occupies an area corresponding to an area of plural pixels out of the unit display pixels. That is, the density of the unit emitting pixels of the area light source is lower than that of the unit display pixels of the display panel. Accordingly, with the above configuration, the area light source no longer needs to have a high resolution, unlike the conventional liquid crystal display device. As a result, it is possible to manufacture an area light source through a manufacturing process using many printing processes, and an increase in the costs for the entire display device is restrained.

On the other hand, in each of the display devices respectively described in Patent Documents 2 to 4, the smallest module unit of the light source affects dividing of the emitting region. This causes difficulties in further dividing the emitting region into regions of a smaller size.

In the foregoing configuration, however, each of the unit emitting pixels includes the electron emitting element for emitting an electron, and the fluorescent substance which emits light by being excited by the electron emitted from the electron emitting element. Therefore, the size of the smallest module (unit emitting pixels) of the area light source can be freely set according to the sizes of the electron emitting element and the fluorescent substance. Thus, it is possible to divide the emitting region into smaller units, irrespective of the smallest module unit of the light source.

Further, since each of the unit emitting pixels occupies an area which is equivalent to an area occupied by plural pixels out of the unit display pixels of the display panel, it is possible to use an area light source whose resolution of the unit emitting pixels is rougher than the unit display pixels of the display panel. Therefore, it is possible to minimize increases in the costs for a driving system or manufacturing of the area light source.

As described, in cases where the emitting regions of the backlight is divided and divided-screen active driving is performed, the configuration allows: (i) division of the emitting regions into smaller units irrespective of the size of the smallest module unit of the light source used as the backlight, and (ii) minimizing increases in the costs for a driving system and manufacturing of the backlight.

Additional objects, features, and strengths of the present invention will be made clear by the description below.

BRIEF DESCRIPTION OF DRAWINGS

FIG. 10 is a perspective diagram showing a configuration of a conventional display device.

BEST MODE FOR CARRYING OUT THE INVENTION

Embodiment 1

The following describes a display device of the present embodiment, with reference to FIG. 1 to FIG. 6(a), FIG. 6(b), and FIG. 6(c).

Note that a display device in the present embodiment is a liquid crystal display device; however, the display device is not limited to the liquid crystal display device. Other types of display devices such as an electrophoresis display can be adopted as the display device, provided that a back area light source (backlight) is used.

Figure 1:
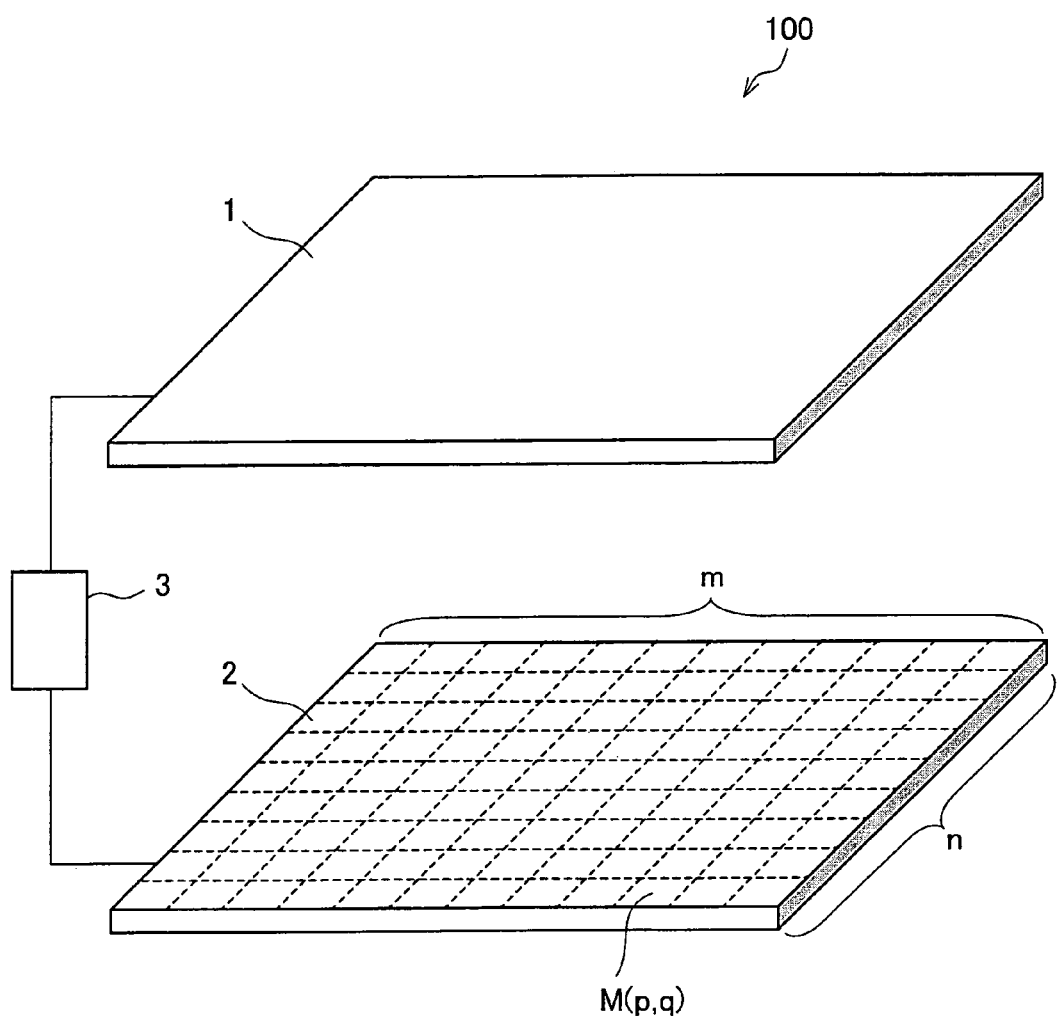
FIG. 1 is a perspective diagram showing a schematic configuration of a display device of the present invention.

FIG. 1 is a perspective diagram showing a schematic configuration of the display device of the present invention. As shown in the figure, the display device 100 includes: a display panel 1 (liquid crystal panel in this case), a backlight 2, and a controlling section 3. The backlight 2 is provided on a back face side (on a surface opposite to the displaying surface) of the display panel 1. This display panel 1 is a transmissive display panel which displays an image by having light from the backlight 2 pass therethrough. Further, the backlight 2 is an area light source having an emitting surface.

The emitting surface (emitting region) of the backlight 2 is divided into m×n (i.e., a predetermined number of emitting regions), and the luminance of each of the divided emitting surfaces (divided emitting regions) is controlled individually. Note that the number of the divided emitting regions of the backlight 2 is m×n=12×9. However, the number of the divided emitting regions of the backlight 2 is not limited to this. Note further that the emitting surface (emitting region) is a region of the backlight 2 functioning as a light source.

In the following, the divided emitting regions are given a symbol M(p, q), where p is an integer ranging from 1 to m, and q is an integer ranging from 1 to n.

To the display panel 1, a video signal is input. Based on luminance information of the video signal, a controlling section 3 drives the backlight 2 by individually controlling the luminance of each of the divided emitting regions M(p, q) forming the emitting region of the backlight 2 (i.e., luminance of the area light source). In this specification, this driving performed by the controlling section 3 is hereinafter referred to as divided-screen active backlight driving.

Figure 2:
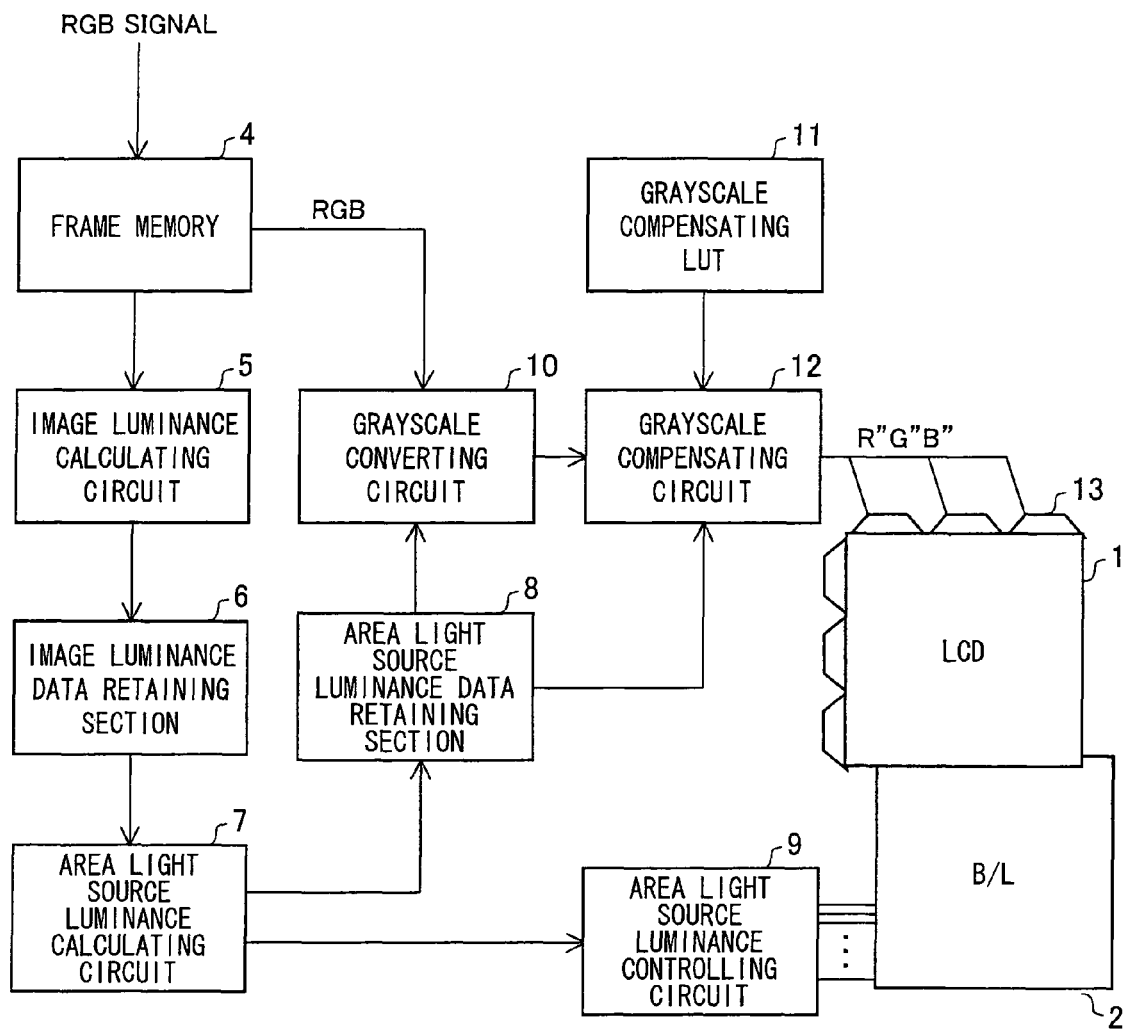
FIG. 2 is a block diagram showing a configuration of a controlling section in the display device of FIG. 1.
Figure 3:
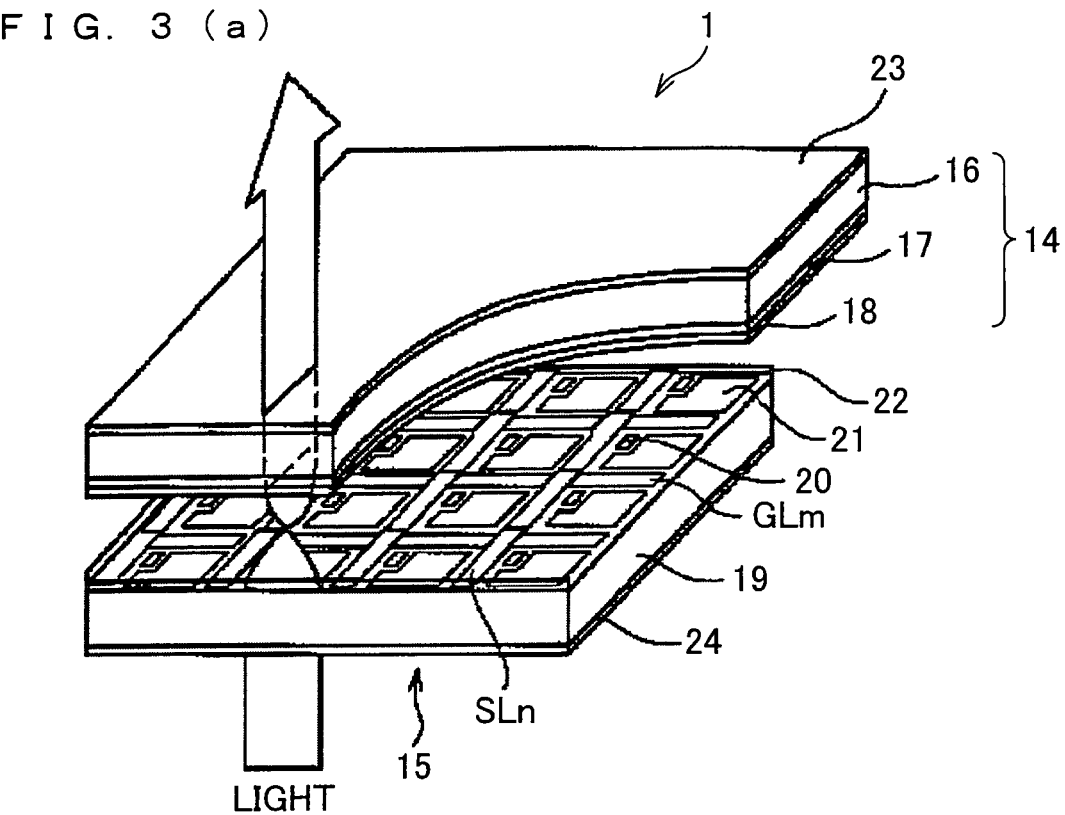
FIG. 3(a) is a schematic configuration of a display panel of the display device of FIG. 1, and is a perspective diagram showing a cross sectional configuration of the display panel.
FIG. 3(b) is an equivalent circuit diagram showing a schematic configuration of the display panel of the display device of FIG. 1.
Figure 3:
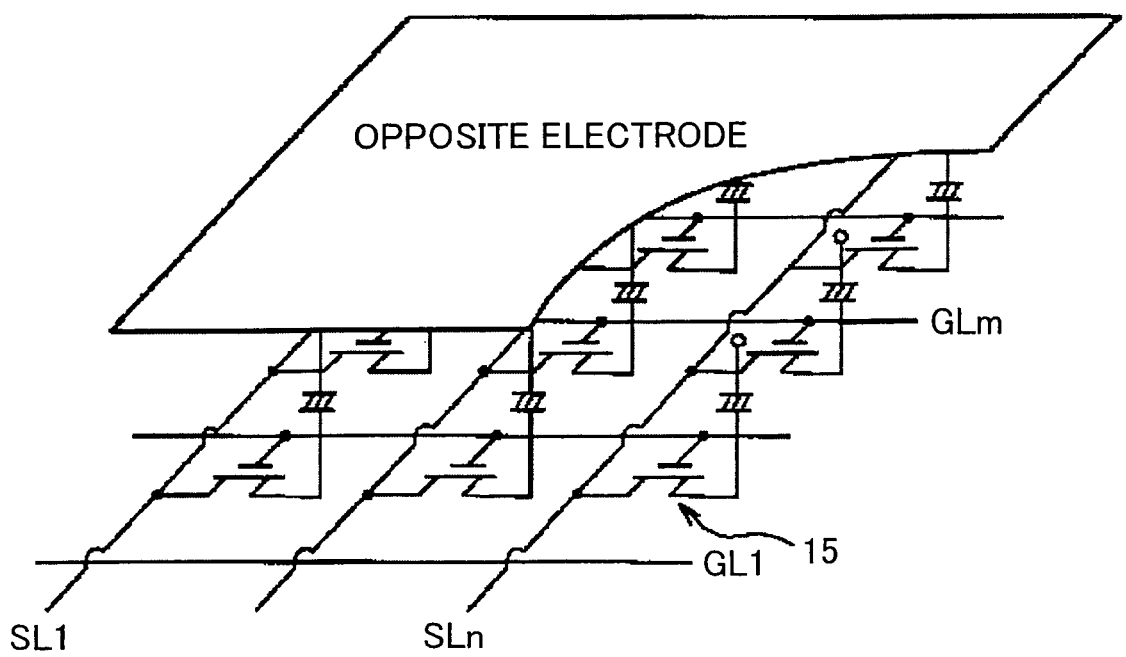
Figure 4:
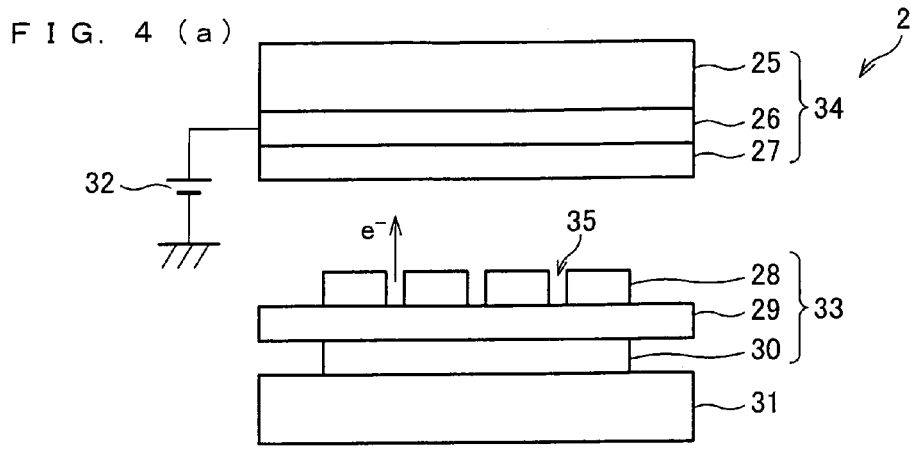
FIG. 4(a) is a cross sectional view showing a schematic configuration of a backlight in the display device of FIG. 1.
FIG. 4(b) is a perspective diagram schematically showing a cross sectional configuration of the backlight in the display device of FIG. 1.
FIG. 4(c) is an equivalent circuit diagram showing a schematic configuration of the backlight in the display device of FIG. 1.
Figure 4:
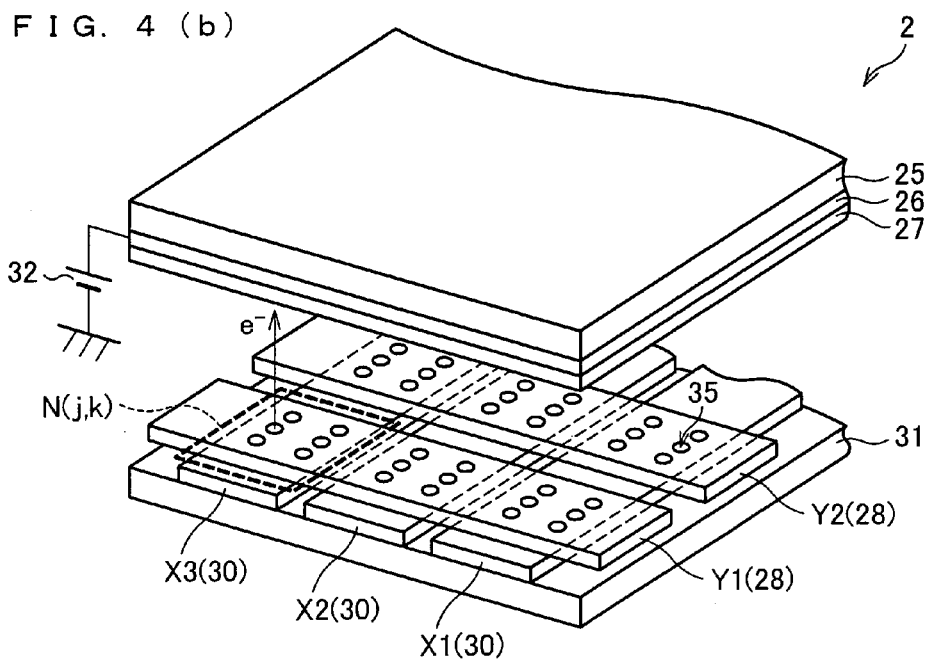
Figure 4:
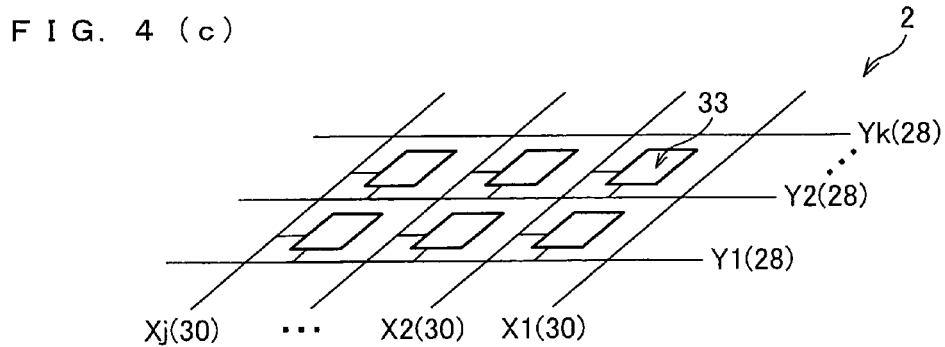
Figure 5:
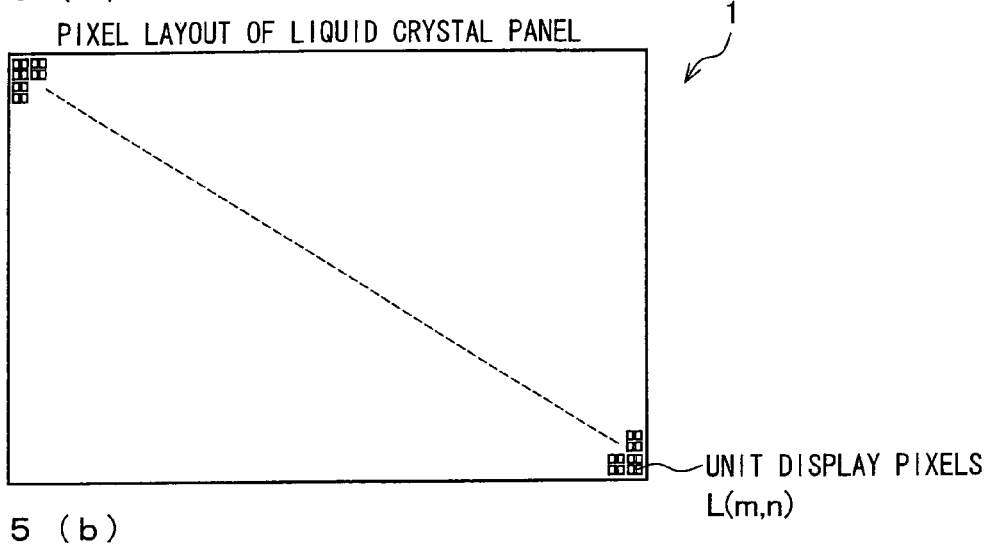
FIG. 5(a) is a plane view showing a layout of pixels of the display panel, and is for explaining relationship among sizes of (i) unit emitting pixels N(j, k) of an area light source, (ii) divided emitting regions M(p, q) of the area light source, and (iii) unit display pixels L(m, n) of the display panel, of Embodiment 1.
FIG. 5(b) is a diagram showing a dividing pattern of a case of dividing an emitting region of the area light source into divided emitting regions of m(rows)×n(columns) for the purpose of performing a divided-screen active backlight driving, and is for explaining relationship among sizes of (i) the unit emitting pixels N(j, k) of the area light source, (ii) the divided emitting regions M(p, q) of the area light source, and (iii) the unit display pixels L(m, n) of the display panel, of Embodiment 1.
FIG. 5(c) is a plane view showing a layout of the unit emitting pixels of the area light source, and is for explaining relationship among sizes of (i) the unit emitting pixels N(j, k) of the area light source, (ii) the divided emitting regions M(p, q) of the area light source, and (iii) the unit display pixels L(m, n) of the display panel, of Embodiment 1.
Figure 5:
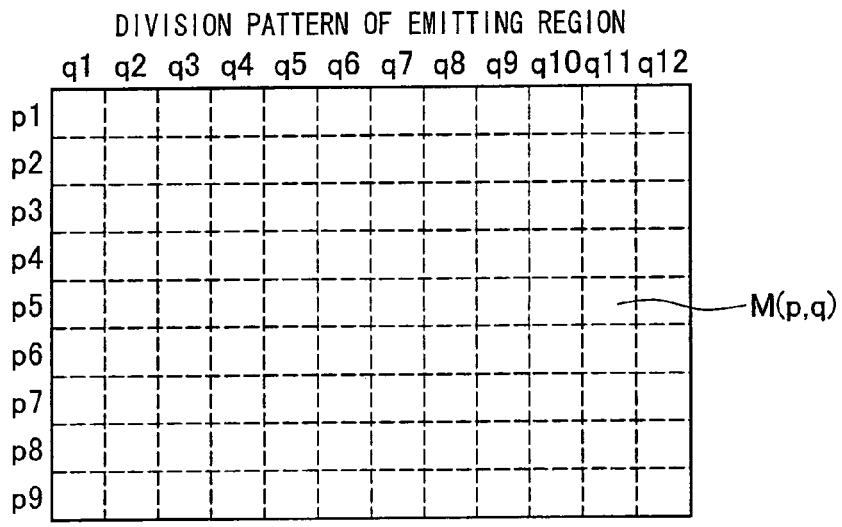
Figure 5:
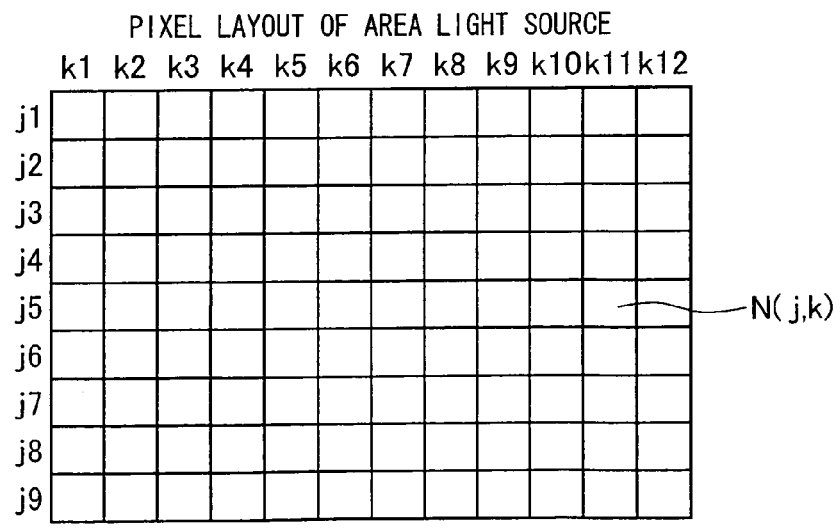

The configuration of the controlling section 3 is more specifically described below with reference to FIG. 2. FIG. 2 is a block diagram showing the configuration of the controlling section in the display device of the present embodiment.

As shown in FIG. 2, the controlling section 3 includes: a frame memory 4; an image luminance calculating circuit 5; an image luminance data retaining section 6; an area light source luminance calculating circuit 7; an area light source luminance data retaining section 8; an area light source luminance controlling circuit 9; a grayscale converting circuit 10; a grayscale compensating LUT (look-up table) 11; a grayscale compensating circuit 12; and an LCD driver 13.

The frame memory 4 is for temporarily storing video signals (RGB input image signals) input from an external signal source. The video signals stored in the frame memory 4 are read out for each of the divided emitting regions M(p, q) (e.g. divided emitting regions of m×n=12×9, in the case of FIG. 1) of the backlight 2. Meanwhile, the video signals are successively read out for each unit display pixel of the display panel 1.

First described is how the video signals read out for divided emitting regions of the backlight 2 are processed.

The image luminance calculating circuit 5 calculates the luminance value (average luminance (APL)) of each divided emitting region of the backlight 2, based on data in the video signals having been read out. Then, the image luminance data retaining section 6 retains data of the luminance value of each divided emitting region which is calculated by the image luminance calculating circuit 5. Based on the data of the luminance value retained by the image luminance data retaining section 6, the area light source luminance calculating circuit 7 calculates the luminance level of each divided emitting region M(p, q) of the backlight 2. Then, the area light source luminance data retaining section 8 retains the luminance data of each divided emitting region M(p, q) calculated by the area light source luminance calculating circuit 7.

The area light source luminance controlling circuit 9 controls the luminance of each emitting region M(p, q) of the backlight 2 (area light source), based on the calculation result (luminance level of each divided emitting region M(p, q)) of the area light source luminance calculating circuit 7.

Next described is how the video signals successively read out for each unit display pixel of display panel 1 are processed.

The grayscale converting circuit 10 performs grayscale modulation with respect to the video signals (RGB input image signals) stored in the frame memory 4, based on the luminance data of the area light source of each divided emitting region M(p, q) which data is retained in the area light source luminance data retaining section 8. Here, the grayscale compensating LUT (look-up table) 11 is an input/output contrasting table for use in correcting (λcorrection or the like) digitalized grayscale data to an intended gray scale.

The grayscale compensating circuit 12 performs appropriate grayscale correction with respect to the video signals having been subjected to the grayscale modulation in the grayscale converting circuit 10. Then, at the end, the grayscale compensating circuit 12 convert the video signals into RGB signals (R" G" B") to be input to the LCD driver 13. At this time, the grayscale compensating circuit 12 performs grayscale correction with respect to the video signals, based on (i) the data of grayscale compensating LUT 11 and (ii) the luminance data of each divided emitting region M(p, q) of the area light source, which data is retained in the area light source luminance data retaining section 8.

Then, at the end, the LCD driver 13 inputs, to the display panel 1, the RGB signal (R" G" B") resulted from the conversion in the grayscale compensating circuit 12, thereby driving the display panel 1.

As described, in the display device 100, the luminance of each of the divided emitting regions M(p,q) of the backlight 2 (area light source) is controlled based on the video signal input. Therefore, for a part of the entire display screen of the display panel 1, which part is overall fed with relatively high (bright) luminance image information, the luminance of the backlight 2 (area light source) is increased according to the luminance information. On the contrary, for a part of the entire display screen of the display panel 1, which part is overall fed with relatively low (dark) luminance image information, the luminance of the backlight 2 (area light source) is decreased according to the luminance information. As a result, the dynamic range of the entire display screen is expanded in the display device 100.

However, when the luminance of the area light source is varied for each of the divided emitting regions M(p, q), there may be a difference amongst luminances of displayed images respectively produced by the divided emitting regions M(p, q), when the input image signal is supplied to the display panel 1 without any changes being made in the grayscale.

However, in the display device 100, the grayscale of the video signals input to the display panel 1 is corrected by the grayscale converting circuit 10 and the grayscale compensating circuit 12, based on the luminance data of each divided emitting region M(p, q) of the area light source, which data is retained in the area light source luminance data retaining section 8. That is, in the display device 100, input video signals are converted according to the respective luminances of the divided emitting regions M(p, q) of the area light source. The grayscale information, which is suitably converted according to the luminances of the divided emitting regions M(p, q) of the area light source, yields a suitable image having no difference in the respective luminances of displayed images of the divided emitting regions M(p, q).

As described, the display device 100 has a wide dynamic range even for an image on the display screen having a large luminance gradient, and is capable of suitably displaying a high quality image.

Next, the configuration of the display panel 1 is described with reference to FIG. 3(a) and FIG. 3(b). FIG. 3(a) is a perspective diagram showing the cross section structure of the display panel 1, and FIG. 3(b) is a diagram of the equivalent circuit of the display panel 1. Here, the display panel 1 is a liquid crystal display panel; however, the display panel 1 is not particularly limited to this provided that the display panel 1 is a transmissive display panel which performs displaying by letting pass light from a backlight arranged on the back surface of display panel.

As shown in these figures, the display panel 1 includes an opposite substrate 14 and an active matrix substrate 15 which interpose therebetween a liquid crystal layer. Further, polarizing plates 23 and 24 are respectively provided on surfaces of the opposite substrate 14 and the active matrix substrate 15 which surfaces are opposite to the surfaces facing each other.

The opposite substrate 14 includes a glass substrate 16, a color filter 17, and an alignment film/opposite electrode 18. The color filter is formed on a surface, of the glass substrate 16, which faces the liquid crystal layer. The alignment film/opposite electrode 18 is formed, on a surface of the color filter 17, which faces the liquid crystal layer.

Further, the active matrix substrate 15 includes: a glass substrate 19, plural scan signal lines GL1 to GLm (where m is an integer of not less than 2), plural data signal lines SL1 to SLn (where n is an integer of not less than 2), switching elements 20, pixel electrodes 21, and an alignment film 22.

The plural scan signal line GL1 to GLm, the plural data signal line SL1 to SLn, the switching elements 20, and the pixel electrodes 21 are formed on the surface, of the glass substrate 19, which faces the liquid crystal layer.

Each of the data signal lines SL1 to SLn is formed so as to intersect the plural scan signal lines GL1 to GLm. Each of the pixel electrodes 21 is provided for each intersection of the data signal line SL1 to SLn and the scan signal line GL1 to GLm. Further, each of the switching elements 20 is formed nearby each intersection of the data signal line SL1 to SLn and the scan signal line GL1 to GLm.

In the following, the part having the switching elements and pixel electrodes 21 is simply referred to as "pixels". Further, the pixels, each of which is provided for each intersection of the data signal lines SL1 to SLn and scan signal lines GL1 to GLm, are referred to as unit display pixels L(m, n).

This display panel 1 is a well-known display panel which is driven by means of active matrix driving. Further, TFTs (thin film transistors) are usually used as the switching elements 20.

That is, when a voltage for performing displaying on the display panel 1 is supplied to the LCD driver (e.g. LCD driver 13 shown in FIG. 2), the data signal lines SL1 to SLn and the scan signal lines GL1 to GLm are driven. When a scan signal line GLi (where i is an integer of not less than 1) is selected in each of the unit display pixels L(m, n), the switching element 20 becomes conductive, and a signal voltage determined based on a display data signal received from a controller (not shown) is applied to the display panel 1, via a data signal line SLi (where i is an integer of not less than 1). When the selected period of the scan signal line GLi elapses, the switching element 20 is switched off. Ideally, the display panel 1 retains a voltage at the time of switching off the switching element 20, while the switching element 20 is being switched off.

Note that the display panel 1 is not limited to the active matrix. For example, it is possible to adopt a passive matrix display panel employing no switching element.

Next described is a configuration of the backlight 2 in the display panel 1.

The backlight (area light source) 2 includes an electron emitting element and a fluorescent substance. The backlight 2 is a field-emitting light source which emits light by being excited by an electron emitted from the electron emitting element. Further, the electron emitting element is not particularly limited provided that electrons are emitted towards the fluorescent substance. Examples of the electron emitting element includes: an electron emitting element having a ferroelectric material; a spinto-type electron emitting element; a carbon nanotube electron emitting element; a surface-conduction electron emitting element (Surface-conduction Electron-emitter); or the like.

Amongst those, it is preferable that the electron emitting element be one having a layer made of a ferroelectric material. The following describes with reference to FIG. 4(a) an exemplary configuration of a backlight 2 (area light source) whose electron emitting element has a layer made of a ferroelectric material. FIG. 4(a) is a cross sectional view showing a schematic configuration of the backlight 2 (area light source).

As shown in FIG. 4(a), the backlight 2 includes: a substrate (ceramic substrate) 31; a power source 32; an electron emitting element 33; and an opposite substrate 34. The electron emitting element 33 is formed on a surface of the substrate 31 opposite to the surface of the substrate facing the opposite substrate 34.

Further, the electron emitting element 33 includes: a cathode electrode 28; an emitter layer 29; and an anode electrode 30. The emitter layer 29 is interposed between the cathode electrode 28 and the anode electrode 30. That is, in the electron emitting element 33, the anode electrode 30, the emitter layer 29, and the cathode electrode 28 are stacked in this order from the side of the substrate 31 towards the side of the opposite substrate 34. Further, the cathode electrode 28 has a large number of microscopic holes (electron emitting holes 35) which pass electrons emitted from the emitter layer 29. These electron emitting holes 35 are formed through an etching or the like, and are used for emitting electrons.

Further, the opposite substrate 34 includes: a glass substrate 25; a transparent electrode (collector electrode) 26; and a fluorescent substance layer 27. The transparent electrode 26 is formed throughout the entire surface, of the glass substrate 25, which is opposite to the surface facing the electron emitting element 33. The transparent electrode 26 is connected to the power source 32. Further, the fluorescent substance layer 27 is formed throughout the entire surface, of the transparent electrode 26, which is opposite to the surface facing the electron emitting element 33.

Further, in the backlight 2, the electron emitting element 33 and the opposite substrate 34 are arranged so as to be apart from each other by a predetermined distance. The space between the electron emitting element 33 and the opposite substrate 34 is kept in the vacuum state.

Further, although it is not illustrated in FIG. 4(a), the anode electrode 30 (X electrode), the cathode electrode 28 (Y electrode), and the transparent electrode 26 are connected to the drive circuit, and a predetermined voltage is applied to them.

When a voltage is applied to the cathode electrode 28 and the anode electrode 30, an electron from the emitter layer 29 passes through the electron emitting holes 35, and is emitted from the electron emitting element 33. Further, when an acceleration voltage (5 to 10 kV) from the power source 32 is applied to the transparent electrode 26, the electron from the electron emitting element 33 having been accelerated hits the fluorescent substance layer 27. In response to the electron having hit, the fluorescent substance layer 27 is excited and light is emitted therefrom.

The transparent electrode 26 functions as a collector electrode, and is made of ITO or the like material. Further, it is possible to form a metal back layer on a surface of, the fluorescent substance layer 27, facing the electron emitting element 33.

The substrate 31 is a ceramic substrate. More specifically, the substrate 31 can be a substrate which is made of zirconium oxide, aluminum oxide, or the like.

The emitter layer 29 is a layer made of a ferroelectric material. An example of the ferroelectric material used for the emitter layer 29 is barium titanate or the like. Further, the emitter layer 29 can be formed by calcining a paste formed through a screen printing.

As shown in FIG. 4(a), in the backlight 2, the electron emitting element 33 and the opposite substrate 34 are arranged apart from each other. By sealing the space the electron emitting element 33 and the opposite substrate 34, while keeping the distance therebetween a predetermined distance (1 to 3 mm) in the vacuum state ($10^{-5}$ torr or more), a passive matrix area light source is made.

fluorescent substance layer 27 is made of a mixed fluorescent material. The mixed fluorescent material includes plural kinds of fluorescent materials which generally emit light of white color in response to the electron from the electron emitting element 33, having been accelerated by the acceleration voltage (5 to 10 kV) applied to the transparent electrode 26. An example of such a mixed fluorescent material is: a mixed material of $ZnS$: Ag, Al (blue), $ZnS$: Cu, Al (green), and $Y_2O_2S$: Eu (red).

The following describes in further detail the arrangement of "unit emitting pixels", the cathode electrode 28, and the anode electrode 30 in the backlight 2, with reference to FIGS. 4(b) and 4(c). FIG. 4(b) is a cross sectional perspective diagram showing a schematic configuration of the backlight 2 (area light source), and FIG. 4(c) is an equivalent circuit diagram. In FIG. 4(b), the emitter layer 29 interposed between the cathode electrode 28 and the anode electrode 30 is omitted to avoid making the figure complicated.

As shown in FIG. 4(b) and FIG. 4(c), plural electrodes X1 to Xj (where j is an integer of 2 or more) each serving as an anode electrode 30 are arranged parallel to one another on the substrate 31. Further, plural electrodes Y1 to Yk (where k is an integer of 2 or more) each serving as a cathode electrode 28 are arranged over the ferroelectric layer so as to intersect the electrodes X1 to Xj. For each intersection of the plural electrodes X1 to Xj and plural electrodes Y1 to Yk, a unit emitting pixel N(j, k) is provided. Here, each "unit emitting pixel" means a unit block formed by the plural electrodes X1 to Xj and plural electrodes Y1 to Yk.

The unit emitting pixels N(j, k) are driven by a passive matrix driving. The following describes in detail the passive matrix driving of the unit emitting pixels N(j, k).

The anode electrodes 30 and cathode electrodes 28 are processed so as to form stripes which perpendicularly cross one another. Each electrode is fed with a scan signal and an image signal. In cases where the emitter layer 29 has a non-linear characteristics, the image signal is written in (or an electron is emitted towards) each unit emitting pixel N(j, k), when a combined voltage of the signals simultaneously applied via the above mentioned two electrodes exceeds the operational threshold voltage of the emitter layer 29. That is, instead of separately forming an active element having non-linear characteristics, the passive matrix driving scans operation lines in a line-sequential manner, utilizing the nonlinear characteristics of the electron emitting element 33 itself.

The method of driving the unit emitting pixels N(j, k) is not limited to the above-described passive matrix driving. For example, it is possible to drive the unit emitting pixels N(j, k) by an active matrix driving using an active element. However, the passive matrix driving does not require an active element required in the active matrix driving. It is therefore possible to restrain increases in the costs. For this reason, it is preferable that the unit emitting pixels N(j, k) be driven by the passive matrix driving.

In the present embodiment, an electron emitting element made of a ferroelectric material is adopted as the emitter layer 29. This is because a highly efficient emission of electrons is possible with a low voltage (passive matrix driving voltage (writing voltage) between an anode and a cathode), as is disclosed in Non-patent document 1. This makes it easier to achieve improved luminance, while reducing the cost for a drive circuit. For a method for forming such an electron emitting element using a ferroelectric material, see Patent document 5 for example.

Next described with reference to FIG. 5(a) to FIG. 5(c) is the relationship amongst sizes of (i) the unit emitting pixels N(j, k) of the area light source, (ii) divided emitting region M(p, q), and (iii) the unit display pixels L(m, n) of the display panel 1. FIG. 5(a) is a plane view showing a layout of pixels of the display panel 1. FIG. 5(b) is a diagram showing a division pattern formed by dividing the emitting region of the area light source into a matrix of m (rows)×n (columns), so as to perform the above-described divided-screen active backlight driving. FIG. 5(c) is a plane view showing a layout of the unit emitting pixels of the area light source.

As shown in FIG. 5(a), in the display panel 1, a large number of the unit display pixels L(m, n) to be controlled by the active matrix driving are arranged in a matrix manner. For example, when the display panel 1 is a VGA monitor, the unit display pixels L(m, n) are aligned in a matrix of 640×480. Further, when the display panel 1 is a WXGA monitor, the unit display pixels L(m, n) are aligned in a matrix of 1280×768. Further, when the display panel 1 is a hi-vision TV, the unit display pixels L(m, n) are arranged in a matrix of 1,366×768 to 1920×1080. As it is obvious from these, the display panel 1 has an extremely large number of pixels.

Further, FIG. 5(b) shows the emitting region of the backlight 2 divided into a division pattern of m (rows)×n (columns), which forms a matrix of 12×9.

Further, k1 to k12 in FIG. 5(c) shows a typical alignment of the plural electrodes X1 to X12 in the case of driving the area light source by the passive matrix driving. Further, j1 to j9 shows a typical alignment of the plural electrode Y1 to Y9. That is, the backlight 2 includes twelve electrodes X and nine electrodes Y which perpendicularly cross one another. For each intersection of the twelve electrodes X1 to X12 and nine electrodes Y1 to Y9, a unit emitting pixel N(j, k) is provided.

As shown in FIG. 5(b) and FIG. 5(c), the divided emitting regions M(p, q) correspond to the unit emitting pixels N(j, k) on a one-to-one basis. Thus, in the backlight 2, the divided emitting region M(p, q) occupies an area which substantially equals an area occupied by the unit emitting pixels N(j, k). Note that the division pattern of the emitting region of the area light source has a size which substantially equals the total size of the unit emitting pixels N(j, k) of the area light source.

Therefore, in the backlight 2, when one of the unit emitting pixels N(j, k) is driven, the corresponding one of the divided emitting regions M(p, q) emits light. For example, a unit emitting pixels N(j2, k3) is driven to have a divided emitting region M(p2, q3) emit light.

On the other hand, as shown in FIG. 5(a) and FIG. 5(c), each of the unit emitting pixels N(j, k) occupies an area corresponding to an area occupied by plural pixels out of the unit display pixels L(m, n) of the display panel 1.

As described, in the display device of the present embodiment, each of the unit emitting pixels of the area light source occupies an area corresponding to an area occupied by plural pixels out of the unit display pixels of the display panel. In short, the unit emitting pixels of the area light source are arranged at a lower density than the unit display pixels of the display panel.

A conventional liquid crystal display device (liquid crystal display device of Patent document 1) as shown in FIG. 10 employs, as a backlight, an FED which is provided with emitting pixels corresponding, on a one-to-one basis, to display pixels of the liquid crystal panel. Therefore, such a conventional liquid crystal display device will require that the resolution of its area light source be as high as that of the liquid crystal panel. For this reason, such a liquid crystal display device employing an FED as its backlight has been causing difficulties in manufacturing an area light source and an increase in the cost for a driving system.

On the contrary, the display device of the present embodiment performs displaying by using a divided-screen active backlight driving method, and includes an area light source whose unit emitting pixel occupies an area equivalent to an area occupied by plural pixels out of the unit display pixels of the liquid crystal panel. Therefore, unlike the conventional liquid crystal display device, the display device of the present embodiment does not require an area light source having a high resolution.

As a result, it is possible to manufacture an area light source through a manufacturing process using many printing processes, and an increase in the cost for the entire display device is restrained. Needless to say that the scale of the drive circuit for driving the area light source can be reduced.

With a display device adopting a divided-screen active backlight driving method described in Patent documents 2 to 4, in which method a fluorescent tube or an LED is used as a backlight, the smallest module unit of the light source affects dividing of the emitting region. This caused difficulties in further dividing the emitting region into regions of smaller sizes.

However, in the display device of the present embodiment, the area light source is a field-emitting light source including a fluorescent substance layer which emits light by being excited by electron emitted from the electron emitting element. Therefore, it is possible to further divide the unit emitting pixels, which is driven by the passive matrix driving, into regions of even smaller sizes.

Further, each unit emitting pixel of the area light source controlled through the passive matrix driving occupies an area corresponding to an area occupied by plural pixels out of the unit display pixels of the display panel. Therefore, it is possible to use an area light source having unit emitting pixels at a lower density than the unit display pixels of the display panel. As a result, it is possible to minimize increases in the cost for a driving system and for manufacturing of the area light source.

Particularly, in cases where a passive matrix driving field-emitting light source including the area light source having (i) plural electron emitting elements and (ii) a fluorescent substance which emits light by being excited by an electron emitted from the electron emitting element, the size of each unit emitting pixel can be freely set by the arrangement pitch of matrix wiring (i.e., electrode X, electrode Y).

Further, compared to cases where fluorescent tubes or LEDs are disposed all over an emitting region as has been done in conventional cases, the space between adjacent unit emitting pixels can be made much narrower.

Further, the luminance distribution in each of the unit emitting pixels is much more even than the conventional case using fluorescent tubes and LEDs. This is advantageous when performing the above-described divided-screen active backlight driving by which luminance is controlled for each of the divided emitting regions.

Next described with reference to FIG. 6(a) to FIG. 6(c) is operations of driving the display panel 1 and backlight 2 in the display device having the unit display pixels L(m, n), the divided emitting region M(p, q), and the unit emitting pixels N(j, k). FIG. 6(a) is an explanatory diagram showing a horizontal scan timing of the display panel 1, and FIG. 6(b) is an explanatory diagram showing an emitting timing of each divided emitting region. FIG. 6(c) is an explanatory diagram showing a horizontal scan timing of the backlight 2. In the display device 100, the emitting regions of the backlight 2 performs light emission, line-sequentially in the horizontal scanning direction, in synchronization with driving of the display panel 1 performed line-sequentially in the horizontal scanning direction.

First, as shown in FIG. 6(a), the horizontal scan timing of the display panel 1 is set according to the timing of a conventional line-sequential driving of liquid crystal panels. That is, in the display panel 1, scan signal lines are selected in a line-sequential manner, and video signals are written into the display panel 1. In other words, in the unit display pixels L(m, n), the scan signal lines GL1, GL2, . . . , GLm are sequentially selected in this order. Then, video signals are sequentially written into each of the unit display pixels L(1, n), L(2, n), . . . , L(m, n) in this order.

The displaying mode of the display panel 1 is a hold mode. Therefore, display data of each unit display pixel is basically retained, until the associated scan signal line is selected in the next frame.

As described above, each divided emitting region M(p, q) occupies an area corresponding to an area occupied by plural pixels out of the unit display pixels L(m, n). Therefore, in the display device 100, each divided emitting region M(p, q) emits light after, video signals are read into plural unit display pixels L(m, n) occupying an area corresponding to the area occupied by the divided emitting region M(p, q). Specifically, as shown in FIG. 6(b), the divided emitting region emits light as follows. For example, divided emitting regions M(p1, q) of p1-th row emit light at a timing when data is written into all the pixels of the display panel 1 corresponding to the divided emitting regions M(p1, q) of p1-th row.

Further, in the display device 100, writing of data into all the pixels of the display panel 1 corresponding to the divided emitting regions M (p1, q) of p1-th row starts at time t0 and ends at time t1. Then, at time t1, writing of data into all the pixels of the display panel 1 corresponding to the divided emitting regions M (p2, q) of p2-th row starts. As such, the divided emitting regions emit light as follows. The divided emitting regions M(p1, q) of p1-th row emit light while data is being written into all the pixels of the display panel 1 corresponding to the divided emitting regions M (p2, q) of p2-th row (i.e., during a period between time t1 and t2).

Next described is the horizontal scan timing of the backlight 2. As mentioned above, divided emitting region M(p, q) occupies an area which substantially equals an area occupied by a unit emitting pixels N(j, k). That is, the divided emitting regions M(p, q) and unit emitting pixels N(j, k) correspond to each other on a one-to-one basis. Therefore, for example, to have the divided emitting regions M(p1, q) of p1-th row emit light, the unit emitting pixels N(j, k) corresponding to the unit emitting pixels of p1-th row are scanned horizontally.

For example, as shown in FIG. 6(c), in cases where a ferroelectric material is used for the electron emitting element 33 of the backlight 2, a p-th scan signal line (electrode Yj) of the backlight 2 is selected and luminance data of the unit emitting pixels in the p-th row is written in, while data is written into pixels of the display panel 1 corresponding to the emitting regions of p-th row. For example, the electrode j1 is selected, and luminance data for the unit emitting pixels N(j1, k) corresponding to the unit emitting pixels of p1-th row is written in, while data is being written into all the pixels of display panel 1 corresponding to divided emitting regions M(p1, q) of p1-th row (i.e., during a period between time t0 and time t1). That way, the light emitting timing as shown in FIG. 6(b) is possible.

Here, the timing of writing luminance data into the unit emitting pixels (i.e., horizontal scan timing of the backlight 2) differs from the light emitting timing of the divided emitting region. This is attributed to the memory characteristic of the ferroelectric material used for the electron emitting element. In this case, the backlight 2 is able to memorize the state in which data is written into the unit emitting pixels. Therefore, by inverting the polarity to be applied to the electron emitting element after the luminance data is written into the unit emitting pixels N(j, k), electrons are emitted at a given timing thereby emitting light from the backlight 2. Thus, by using a ferroelectric material, having the memory characteristic, for the electron emitting element, it is possible to desirably set the timing of writing luminance data into unit emitting pixels and the light emitting timing of the divided emitting regions.

The above description deals with the case where a ferroelectric material having a memory characteristic is used for the electron emitting element; however, a different material can be used for the electron emitting element, in which case the timing of writing luminance data into the unit emitting pixels (horizontal scan timing of the backlight 2) and the light emitting timing of the divided emitting regions are set so as to be the same.

Embodiment 2

The following describes a display device of another embodiment according to present invention.

The display device of the present embodiment is the same as the display device of the foregoing embodiment 1, except for the relationship between sizes of the unit emitting pixels; divided emitting region; and unit display pixels. In the liquid crystal display device of present embodiment, the respective configurations of a display panel, a backlight, and a controlling section are the same as those described in the embodiment 1, and explanations therefor are omitted here.

Figure 7:
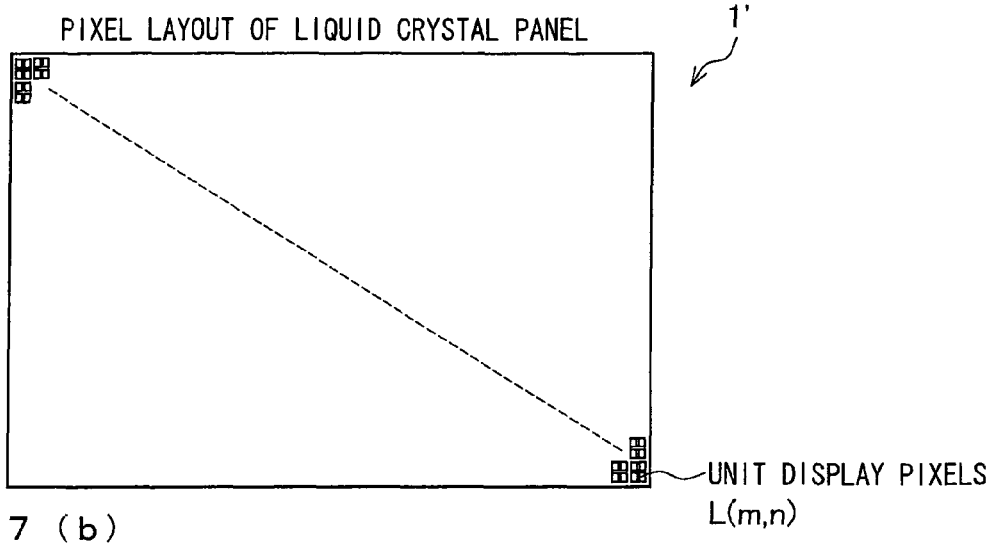
FIG. 7(a) is a plane view showing a layout of pixels of the display panel, and is for explaining relationship among sizes of (i) unit emitting pixels N(j', k') of a backlight, (ii) divided emitting regions M(p', q') of the backlight, and (iii) unit display pixels L(m, n) of Embodiment 2.
FIG. 7(b) is a diagram showing a dividing pattern of a case of dividing an emitting region of the backlight into divided emitting regions of m(rows)×n(columns) for the purpose of performing a divided-screen active backlight driving, and is for explaining relationship among sizes of (i) the unit emitting pixels N(j', k') of the backlight, (ii) the divided emitting regions M(p', q') of the backlight, and (iii) the unit display pixels L(m, n) of Embodiment 2.
FIG. 7(c) is a plane view showing a layout of the unit emitting pixels of the backlight, and is for explaining relationship among sizes of (i) the unit emitting pixels N(j', k') of the backlight, (ii) the divided emitting regions M(p', q') of the backlight, and (iii) the unit display pixels L(m, n) of Embodiment 2.
Figure 7:
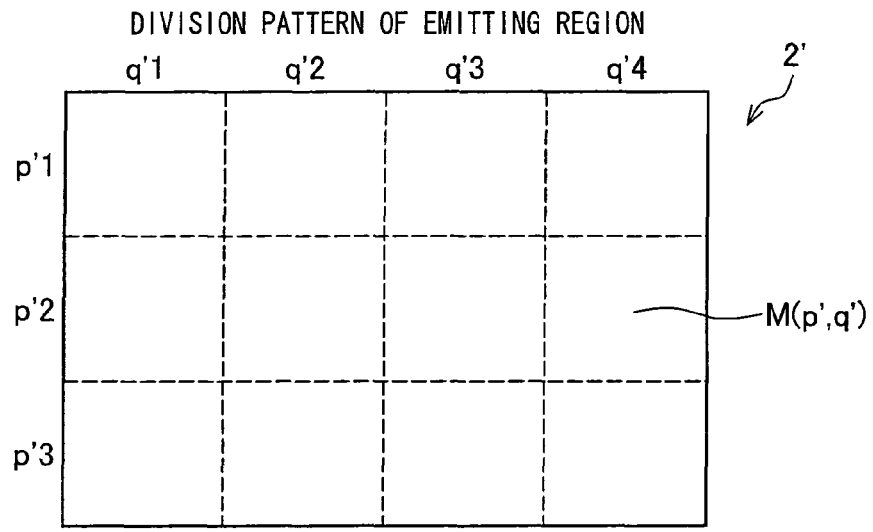
Figure 7:
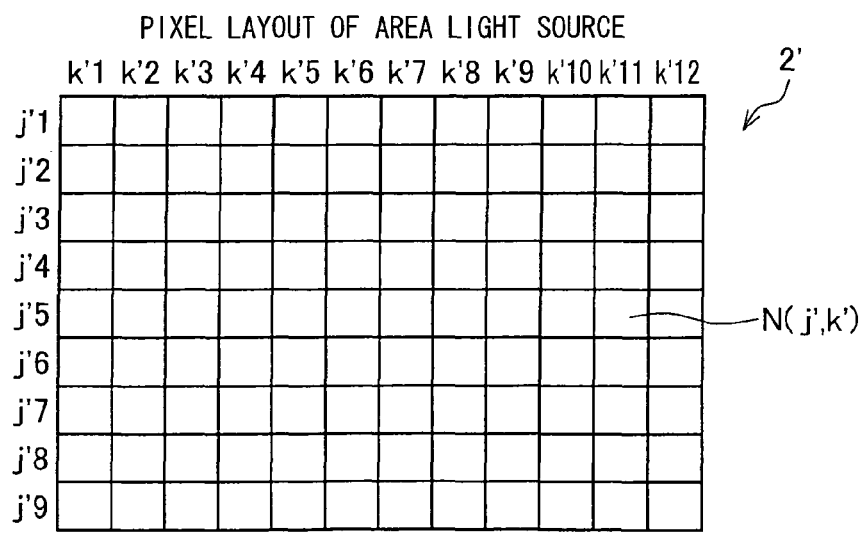

Next described with reference to FIG. 7(*a*) to FIG. 7(*c*) is the relationship amongst sizes of (i) the unit emitting pixels N(j', k') of the area light source, (ii) divided emitting region M(p', q'), and (iii) the unit display pixels L(m, n), in the display device of the present embodiment. FIG. 7(*a*) is a plane view showing a layout of pixels of the display panel 1 in the display device of the present embodiment. FIG. 7(*b*) is a diagram showing a division pattern formed by dividing the emitting region of the backlight into a matrix of m (rows)×n (columns), so as to perform a divided-screen active backlight driving. FIG. 7(*c*) is a plane view showing a layout of the unit emitting pixels of the backlight.

As shown in FIG. 7(*a*), in the display panel 1', a large number of the unit display pixels L(m, n) to be controlled by the active matrix driving are arranged in a matrix manner. For example, when the display panel 1 is a VGA monitor, the unit display pixels L(m, n) are aligned in a matrix of 640×480. Further, when the display panel 1' is a WXGA monitor, the unit display pixels L(m, n) are aligned in a matrix of 1280× 768. Further, when the display panel 1' is a hi-vision TV, the unit display pixels L(m, n) are arranged in a matrix of 1,366× 768 to 1920×1080. As it is obvious from these, the display panel 1' has an extremely large number of pixels.

Further, FIG. 7(*b*) shows the emitting region of the backlight 2' divided into a division pattern of m (rows)×n (columns), which forms a matrix of 4×3.

Further, k'1 to k'12 in FIG. 7(*c*) shows a typical alignment of the plural electrodes X1 to X12 in the case of driving the area light source by the passive matrix driving. Further, j'1 to j'9 shows a typical alignment of the plural electrode Y1 to Y9. That is, the backlight 2' includes twelve electrodes X and nine electrodes Y which perpendicularly cross one another. For each intersection of the twelve electrodes X1 to X12 and nine electrodes Y1 to Y9 a, unit emitting pixel N(j', k') is provided.

On the other hand, as shown in FIG. 7(*a*) and FIG. 7(*c*), each of the unit emitting pixels N(j', k') occupies an area corresponding to an area occupied by sixteen unit display pixels L(m, n) of the display panel 1.

As described, in the display device of the present embodiment, each of the unit emitting pixels of the area light source occupies an area corresponding to an area occupied by plural pixels out of the unit display pixels of the display panel. In short, the unit emitting pixels of the area light source are arranged at a lower density than the unit display pixels of the display panel.

As shown in FIG. 7(*b*) and FIG. 7(*c*), each of the divided emitting regions M(p', q') occupies an area corresponding to an area occupied by nine unit emitting pixels N(j', k'). That is in the display device of the present embodiment, each divided emitting region has a size which substantially equals that of plural unit emitting pixels of the area light source. As described, a configuration in which light from plural unit emitting pixels illuminates a single emitting region is possible.

The above-described case will also yields effects that are similar to those of the foregoing embodiment 1. In cases of an area light source in which resolution of the unit emitting pixels and that of the divided emitting regions are the same, and the number of partitions are different (i.e., unit emitting pixels and divided emitting regions have different sizes), the same effects can be obtained by suitably changing the number of the unit emitting pixels corresponding to a single divided emitting region. Therefore, it is advantageous.

Figure 8:
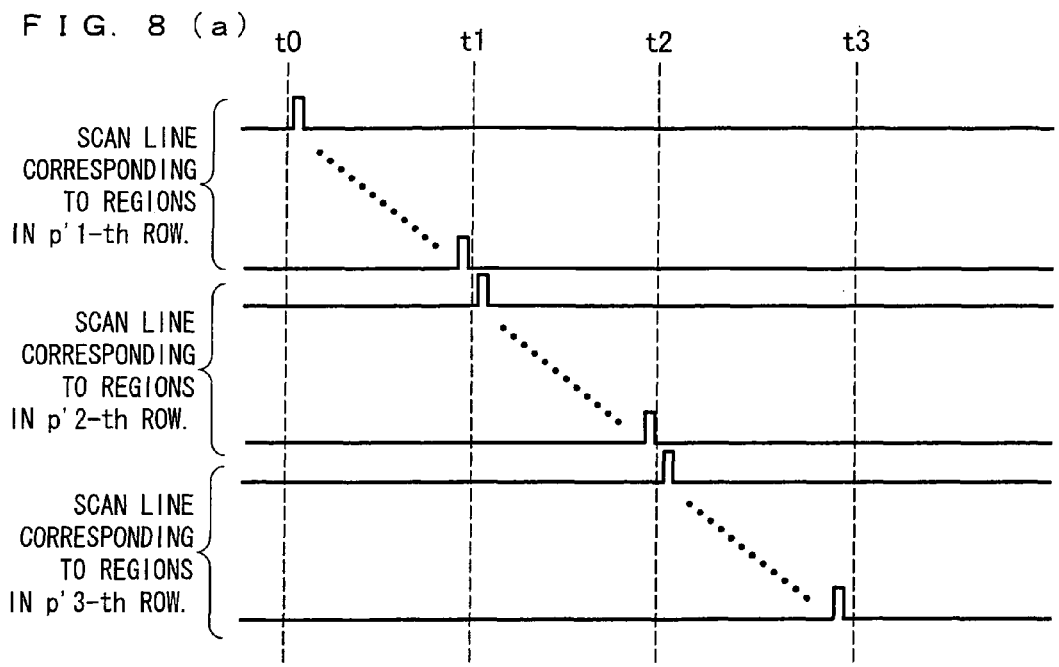
FIG. 8(a) shows an operation of driving the display panel 1' and the backlight 2' in a display device of Embodiment 2 having the unit display pixels L(m, n), the divided emitting regions M(p', q'), and the unit emitting pixels N(j', k'), and is an explanatory diagram showing a horizontal scan timing of the display panel 1'.
FIG. 8(b) shows an operation of driving the display panel 1' and the backlight 2' in a display device of Embodiment 2 having the unit display pixels L(m, n), the divided emitting regions M(p', q'), and the unit emitting pixels N(j', k'), and is an explanatory diagram showing a light emitting timing of the divided emitting regions.
FIG. 8(c) shows an operation of driving the display panel 1' and the backlight 2' in a display device of Embodiment 2 having the unit display pixels L(m, n), the divided emitting regions M(p', q'), and the unit emitting pixels N(j', k'), and is an explanatory diagram showing a horizontal scan timing of the backlight 2'.
Figure 8:
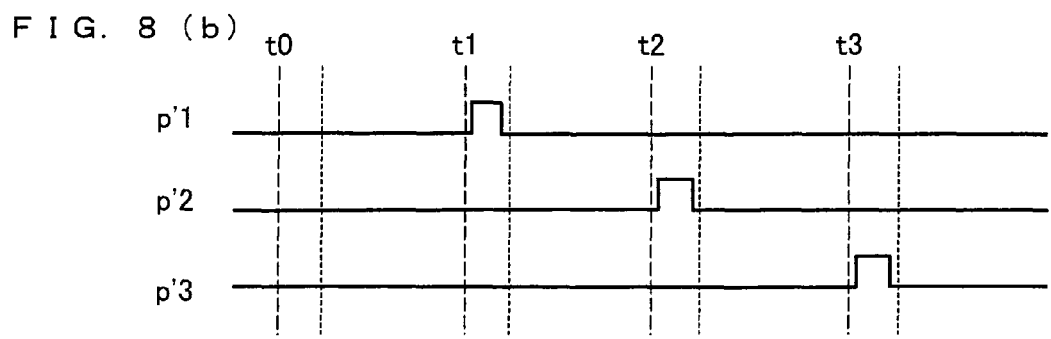
Figure 8:
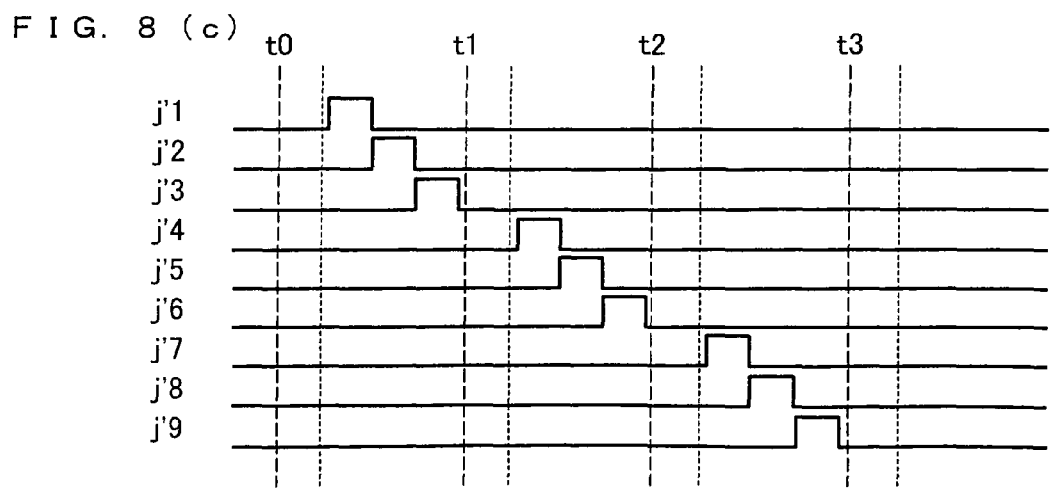

Next described with reference to FIG. 8(*a*) to FIG. 8(*c*) is operations of driving the display panel 1' and backlight 2' in the display device having the unit display pixels L(m, n), the divided emitting regions M(p', q'), and the unit emitting pixels N(j', k'). FIG. 8(*a*) is an explanatory diagram showing a horizontal scan timing of the display panel 1', and FIG. 8(*b*) is an explanatory diagram showing an emitting timing of each divided emitting region. FIG. 8(*c*) is an explanatory diagram showing a horizontal scan timing of the backlight 2'.

First, as shown in FIG. 8(*a*), the horizontal scan timing of the display panel 1' is set according to the timing of a conventional line-sequential driving of liquid crystal panels. That is, in the display panel 1, scan signal lines are selected in a line-sequential manner, and video signals are written into the display panel 1'. In other words, in the unit display pixels L(m, n), the scan signal lines GL1, GL2, . . . , GLm are sequentially selected in this order. Then, video signals are sequentially written into each of the unit display pixels L(1,n), L(2, n), . . . , L(m, n) in this order.

The displaying mode of the display panel 1' is a hold mode. Therefore, display data of each unit display pixel is basically retained, until the associated scan signal line is selected in the next frame.

Further, as in the foregoing embodiment 1, each divided emitting region M(p', q') occupies an area corresponding to an area occupied by plural pixels out of the unit display pixels L(m, n). Therefore, each divided emitting region M(p', q') emits light after, video signals are read into plural unit display pixels L(m, n) occupying an area corresponding to the area occupied by the divided emitting region M(p', q'). That is, as shown in FIG. 8(*b*), the divided emitting regions emits light at the following timing. For example, divided emitting regions M(p1', q) of P1'-th row emit light at a timing when data is written into all the pixels of the display panel 1' corresponding to the divided emitting regions M(p1', q) of P'l-th row.

Further, writing of data into all the pixels of the display panel 1' corresponding to the divided emitting regions M (p'1, q) of p'1-th row starts at time t'0 and ends at time t'1. Then, at time t'1, writing of data into all the pixels of the display panel 1' corresponding to the divided emitting regions M (p'2, q) of p'2-th row starts. As such, the divided emitting regions emit light as follows. The divided emitting regions M(p'1, q) of p'1-th row emit light while data is being written into all the pixels of the display panel 1' corresponding to the divided emitting regions M (p'2, q) of p'2-th row (i.e., during a period between time t'1 and t'2).

Next described is the horizontal scan timing of the backlight 2. As mentioned above, divided emitting region M(p', q') occupies an area which substantially equals an area occupied by plural pixels out of the unit emitting pixels N(j', k')(in this case 9 unit emitting pixels). That is, the divided emitting regions M(p, q) and unit emitting pixels N(j, k) correspond to each other on a one-to-one basis. That is, a single divided emitting region M(p', q') emits light by driving plural unit emitting pixels N(j', k'). Therefore, for example, to have the divided emitting regions M(p1', q) of p1'-th row emit light, the unit emitting pixels corresponding to the P'1-th row (i.e., unit emitting pixels N(j'1, k) to N(j'3, k) in the j'1 to j'3-th rows) are horizontally scanned.

For example, as shown in FIG. 8(c), in cases where a ferroelectric material is used for the electron emitting element 33 of the backlight 2', a p'-th scan signal line (electrode Yj) of the backlight 2 is selected and luminance data of the unit emitting pixels in the p'-th row is written in, plural scan signal lines (plural electrodes Yj') corresponding to the divided emitting regions of the P'-th row of the area light source are selected and luminance data of the unit emitting pixels corresponding to the p'-th line is written in a line-sequential manner, while data is written into pixels of the display panel 1 corresponding to the emitting regions of p'-th row. For example, the electrodes j'1 to j'3 are selected, and luminance data for the unit emitting pixels N(j'1, k) to N(j'3, k) corresponding to the unit emitting pixels of p'1-th row is written in, while data is being written into all the pixels of display panel 1' corresponding to divided emitting regions M(p'1, q) of p'1-th row (i.e., during a period between time t'0 and time t'1). That way, the light emitting timing as shown in FIG. 8(b) is possible. Note that, when luminance data of emitting regions in the p1-th row is written in, data is successively written in scan signal lines (electrode Yj'1 to Yj'3) of J'$^{11}$ to J'3.

Here, the timing of writing luminance data into the unit emitting pixels (i.e., horizontal scan timing of the backlight 2) differs from the light emitting timing of the divided emitting region. This is attributed to the memory characteristic of the ferroelectric material used for the electron emitting element. In this case, the backlight 2 is able to memorize the state in which data is written into the unit emitting pixels. Therefore, by inverting the polarity to be applied to the electron emitting element after the luminance data is written into the unit emitting pixels N(j, k), electrons are emitted at a given timing thereby emitting light from the backlight 2. Thus, by using a ferroelectric material, having the memory characteristic, for the electron emitting element, it is possible to desirably set the timing of writing luminance data into unit emitting pixels and the light emitting timing of the divided emitting regions.

The above description deals with the case where a ferroelectric material having a memory characteristic is used for the electron emitting element; however, a different material can be used for the electron emitting element, in which case the timing of writing luminance data into the unit emitting pixels (horizontal scan timing of the backlight 2) and the light emitting timing of the divided emitting regions are set so as to be the same.

Embodiment 3

The following describes a display device of yet another embodiment according to present invention.

The display device of the present embodiment is the same as the display devices of the foregoing embodiments 1 and 2, except for the layout of unit emitting pixels of a backlight. In the liquid crystal display device of present embodiment, the respective configurations of a display panel and a controlling section are the same as those described in the embodiment 1, and explanations therefor are omitted here.

Figure 9:
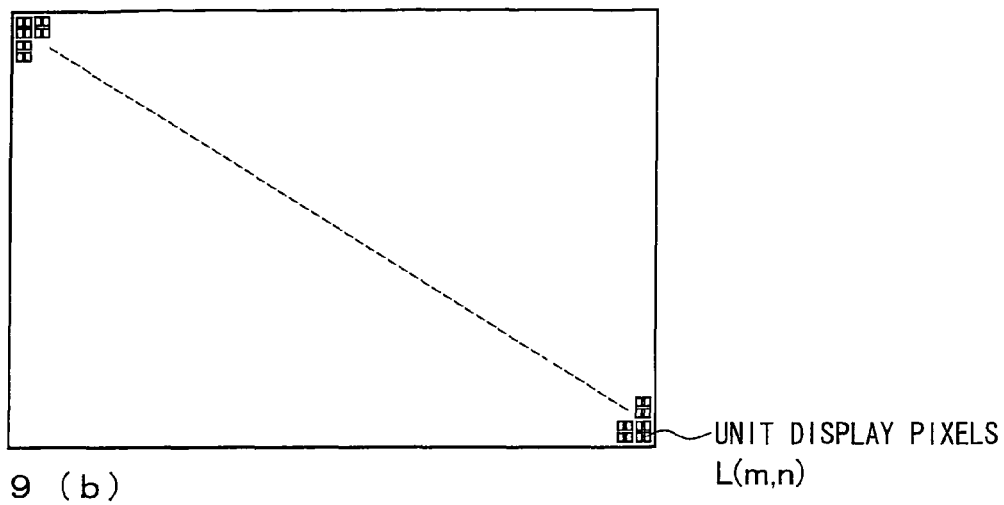
FIG. 9(a) is a plane view showing a layout of pixels of the display panel, and is for explaining relationship among sizes of (i) unit emitting pixels N(j'', k'') of a backlight, (ii) divided emitting regions M(p'', q'') of the backlight, and (iii) unit display pixels L(m, n) of Embodiment 3.
FIG. 9(b) is a diagram showing a dividing pattern of a case of dividing an emitting region of the backlight into divided emitting regions of m(rows)×n(columns) for the purpose of performing a divided-screen active backlight driving, and is for explaining relationship among sizes of (i) the unit emitting pixels N(j'', k'') of the backlight, (ii) the divided emitting regions M(p'', q'') of the backlight, and (iii) the unit display pixels L(m, n) of Embodiment 3.
FIG. 9(c) is a plane view showing a layout of the unit emitting pixels of the backlight, and is for explaining relationship among sizes of (i) the unit emitting pixels N(j'', k'') of the backlight, (ii) the divided emitting regions M(p'', q'') of the backlight, and (iii) the unit display pixels L(m, n) of Embodiment 3.
Figure 9:
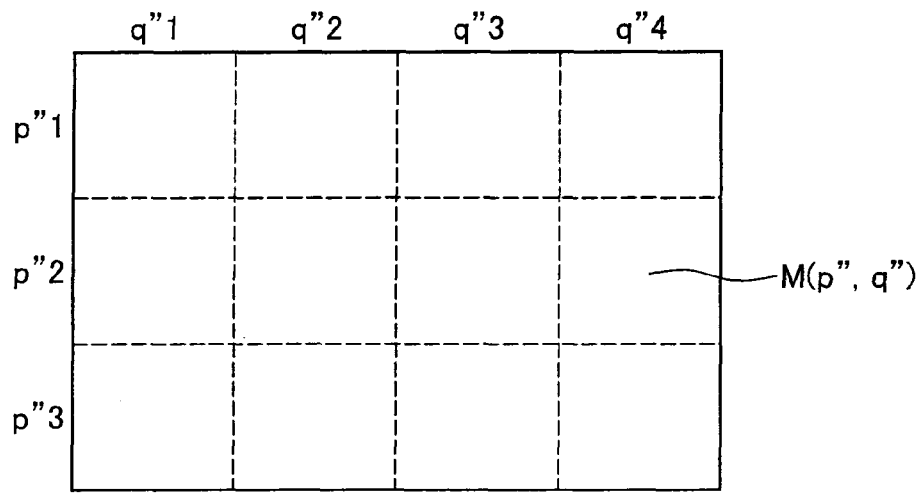
Figure 9:
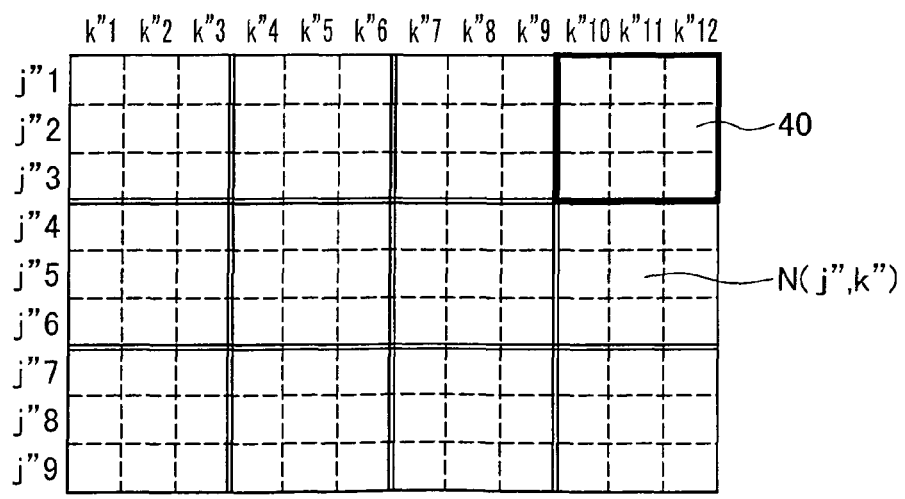

Next described with reference to FIG. 9(a) to FIG. 9(c) is the layout of unit emitting pixels of a backlight in the display device of the present embodiment. FIG. 9(a) is a plane view showing a layout of pixels of the display panel 1 in the display device of the present embodiment. FIG. 9(b) is a diagram showing a division pattern formed by dividing the emitting region of the backlight into a matrix of m (rows)×n (columns), so as to perform a divided-screen active backlight driving. FIG. 9(c) is a plane view showing a layout of the unit emitting pixels of the backlight.

As shown in FIG. 7(a), in the display panel 1", a large number of the unit display pixels L(m, n) to be controlled by the active matrix driving are arranged in a matrix manner. For example, when the display panel 1" is a VGA monitor, the unit display pixels L(m, n) are aligned in a matrix of 640×480. Further, when the display panel 1" is a WXGA monitor, the unit display pixels L(m, n) are aligned in a matrix of 1280×768. Further, when the display panel 1' is a hi-vision TV, the unit display pixels L(m, n) are arranged in a matrix of 1,366×768 to 1920×1080. As it is obvious from these, the display panel 1' has an extremely large number of pixels.

Further, FIG. 9(b) shows the emitting region of the backlight 2" divided into a division pattern of m (rows)×n (columns), which forms a matrix of 4×3.

Further, k"1 to k"12 in FIG. 9(c) shows a typical alignment of the plural electrodes X1 to X12 in the case of driving the area light source by the passive matrix driving. Further, j"1 to j"9 shows a typical alignment of the plural electrode Y1 to Y9. That is, the backlight 2" includes twelve electrodes X and nine electrodes Y which perpendicularly cross one another. For each intersection of the twelve electrodes X1 to X12 and nine electrodes Y1 to Y9 a, unit emitting pixel N(j", k") is provided.

Further, the backlight 2" includes small area light sources 40 each having unit emitting pixels N(j", k") forming a matrix of 3×3. The area light sources 40 are arranged like tiles of 4×3.

As a result, in addition to above mentioned effects, it is further possible to reduce the size of the small area light sources. This is advantageous in that a ceramic substrate can be used as a material for the substrate of an area light source (it is difficult to increase the planer dimension of a ceramics substrate compared to a glass substrate).

That is, in manufacturing of an area light source, it is possible to manufacture a small area light source at a time, instead of manufacturing one whole area light source. Accordingly, the substrate of the area light source can be a material having difficulties when forming a substrate with a large planer dimension.

Further, when compared to a case of performing a line-sequential driving with respect to a single large area light source, it is more advantageous to simultaneously drive all the small area light sources having a small resolution in that drive signals to the flat source surfaces hardly delay. Therefore, an area light source having a large planer dimension can be easily formed. Further, since the resolution of each of the small area light source is small, drive circuits therefor can be simplified.

Figure 6:
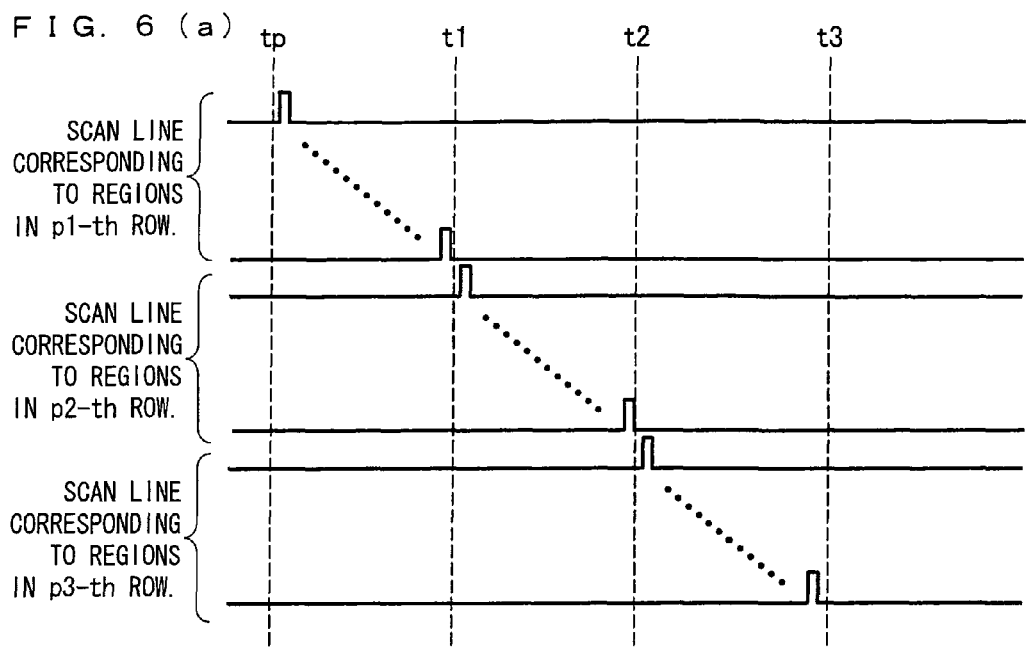
FIG. 6(a) shows an operation of driving the display panel and the backlight in a display device of Embodiment 1 having the unit display pixels L(m, n), the divided emitting regions M(p, q), and the unit emitting pixels N(j, k), and is an explanatory diagram showing a horizontal scan timing of the display panel.
FIG. 6(b) shows an operation of driving the display panel and the backlight in a display device of Embodiment 1 having the unit display pixels L(m, n), the divided emitting regions M(p, q), and the unit emitting pixels N(j, k), and is an explanatory diagram showing a light emitting timing of the divided emitting regions.
FIG. 6(c) shows an operation of driving the display panel and the backlight in a display device of Embodiment 1 having the unit display pixels L(m, n), the divided emitting regions M(p, q), and the unit emitting pixels N(j, k), and is an explanatory diagram showing a horizontal scan timing of the backlight.
Figure 6:
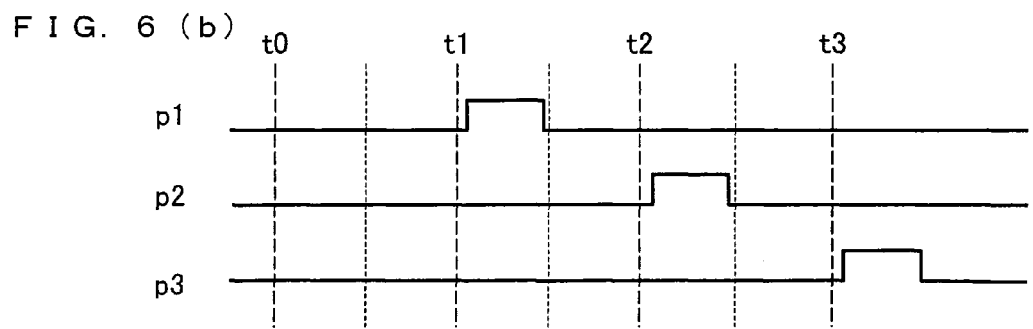
Figure 6:
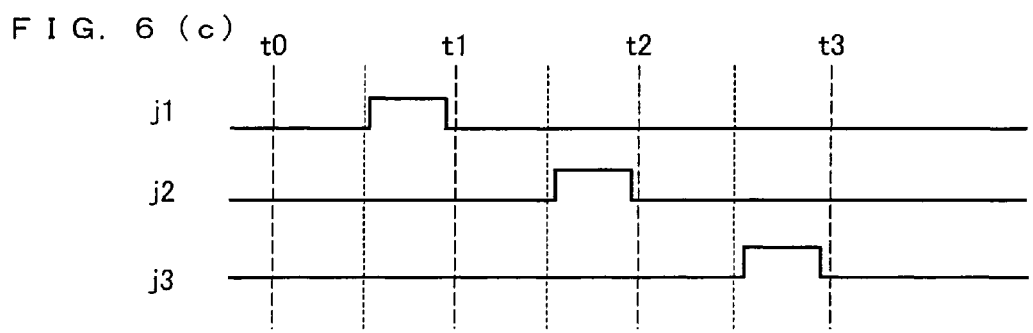

(a) liquid crystal panel horizontal scan timing, (b) light emitting timing of the divided emitting regions, and (c) horizontal scan timing of the area light source are the same as those explained with reference FIG. 6, in the foregoing embodiment 1.

In the above-described driving of the divided-screen active backlight, the area light source line-sequentially performs light emission in synchronization with driving of the liquid crystal display panel performed line-sequentially in the horizontal scanning direction. As a result, an impulse light emitting driving is possible.

Accordingly, the display device of the present invention has a wide dynamic range even for an image on the display screen having a large luminance gradient, and is capable of suitably displaying a high quality image. Further, with the impulse light emission, it is possible to display a high quality image which quality is suitable even for a video.

Note that the dividing pattern (m×n) of an emitting region of a display device, the number (density) of the unit emitting pixels on an area light source are not limited to those examples mentioned in the foregoing embodiments, and can be suitably varied, provided that the unit emitting pixels of the area light source occupies an area corresponding to plural pixels out of the unit display pixels of the display panel.

Note further that the number of the small area light sources is not limited to that mentioned in Embodiment 2.

It is possible to say that a display device of the present invention includes: transmissive display panel having plural unit display pixels; an area light source arranged on a back surface of the transmissive display panel, the area light source having an emitting region divided into a predetermined number of plural regions; and a controlling circuit for individually controlling luminance of the divided emitting regions of the area light source, based on luminance information of video signals input, wherein the area light source is a passive matrix driven field-emitting light source including plural electron emitting element and a fluorescent substance which emits light by being excited by an electron emitted from the electron emitting element, and the area light source has unit emitting pixels controlled by the passive matrix driving, each of which pixels occupies an area corresponding to plural pixels out of the unit display pixels of the transmissive display panel.

Further, it is possible to say that the display device of the present invention is adapted so that each of the emitting region occupies an area which substantially equals an area occupied by each of the unit emitting pixels of the area light source.

Further, it is possible to say that the display device of the present invention is adapted so that each of the divided emitting regions occupies an area which substantially equals an area occupied by plural pixels out of the unit emitting pixels of the area light source.

Further, it is possible to say that the display device of the present invention is adapted so that the area light source has small area light sources which is a unit of plural pixels out of the unit emitting pixels of the area light source, the small area light sources being arranged like tiles.

Further, it is possible to say that the display device of the present invention is adapted so that the electron emitting element is made of a ferroelectric material.

Further, it is possible to say that the display device of the present invention is adapted so that light emission of the emitting region is performed line-sequentially in a horizontal scanning direction, in synchronization with driving of the transmissive display panel performed line-sequentially in the horizontal scanning direction.

The present invention is not limited to the embodiments above, but may be altered within the scope of the claims. An embodiment based on a proper combination of technical means disclosed in different embodiments is encompassed in the technical scope of the present invention.

As mentioned above, a display device of the present invention includes an area light source which includes: plural unit emitting pixels which control light emission of divided emitting regions by being subjected to matrix driving, the unit emitting pixels each including an electron emitting element for emitting an electron, and a fluorescent substance which emits light by being excited by the electron emitted from the electron emitting element, and the unit emitting pixels each occupying an area corresponding to an area occupied by plural pixels out of the plural unit display pixels.

Since each of the unit emitting pixels includes the electron emitting element for emitting an electron, and the fluorescent substance which emits light by being excited by the electron emitted from the electron emitting element, the size of the smallest module (unit emitting pixels) of the area light source can be freely set according to the sizes of the electron emitting element and the fluorescent substance. Therefore, with the configuration, it is possible to divide the emitting region into smaller units, irrespective of the smallest module unit of the light source.

Further, since each of the unit emitting pixels occupies an area corresponding to an area occupied by plural pixels out of the unit display pixels of the display panel, it is possible to use an area light source whose resolution of the unit emitting pixels is rougher than the unit display pixels of the display panel. Therefore, it is possible to minimize increases in the costs for a driving system or manufacturing of the area light source.

The display device of the present invention may be adapted so that: the divided emitting regions occupy an area which equals an area occupied by the unit emitting pixels.

With the configuration, the partition of the divided emitting regions and that of unit emitting pixels are prevented from mismatching from each other. Therefore, natural displaying is possible. Note that, by the wording "equals", it means that each of the divided emitting regions occupies an area which substantially equals an area occupied by the unit emitting pixels. Accordingly, the area of each of the divided emitting regions and that of each of the unit emitting pixels may be equal to each other within a design range of a display device in practical use.

The display device of the present invention may be adapted so that: each of the divided emitting regions occupy an area which equals an area occupied by plural pixels out of the unit emitting pixels.

With the configuration, for example, in cases of an area light source in which resolution of the unit emitting pixels and that of the divided emitting regions are the same, and the number of partitions are different (i.e., unit emitting pixels and divided emitting regions have different sizes), the same effects can be obtained by suitably changing the number of the unit emitting pixels corresponding to a single divided emitting region. Therefore, it is advantageous.

The display device of the present invention is preferably adapted so that the area light source further includes small area light sources each of which is a unit of plural pixels out of the unit emitting pixels, the small area light sources are arranged like tiles. Note that, by the wording "arranged like tiles", it means the plural area light sources each having a rectangular shape are arranged like a grid or a matrix.

The area light source is arranged with plural small area light sources each of which is a single unit. Therefore, in manufacturing of an area light source, it is possible to manufacture a small area light source at a time, instead of manufacturing one whole area light source. Accordingly, the substrate of the area light source can be a material having difficulties when forming a substrate with a large planer dimension.

Further, when compared to a case of performing a driving with respect to a single large area light source, it is more advantageous to simultaneously drive all the small area light sources having a small resolution in that drive signals to the flat source surfaces hardly delay. Therefore, an area light source having a large planer dimension can be easily formed. Further, since the resolution of each of the small area light source is small, drive circuits therefor can be simplified.

The display device of the present invention is preferably adapted so that the electron emitting element includes an emitter layer made of a ferroelectric layer.

With the configuration, the emitter layer is made of a ferroelectric material. Therefore, a highly efficient emission of electrons is possible with a low voltage (passive matrix driving voltage (writing voltage) between an anode and a cathode). This makes it easier to achieve improved luminance, while reducing the cost for a drive circuit.

Thus, by using a ferroelectric material, having the memory characteristic, for the electron emitting element, it is possible to desirably set the timing of writing luminance data into unit emitting pixels and the light emitting timing of the divided emitting regions.

Further, the display device of the present invention is preferably adapted so that the matrix driving is a passive matrix driving.

In the configuration, the unit emitting pixels control light emission of the divided emitting regions by being subjected to a passive matrix driving. Unlike a case of active matrix driving using active elements, the passive matrix driving does not require formation of active elements. Therefore, it is possible to restrain an increase in the costs.

Further, the display device of the present invention is preferably adapted so that light emission of the emitting regions is performed line-sequentially in the horizontal scanning direction, in synchronization with driving of the display panel performed line-sequentially in the horizontal scanning direction.

Accordingly, it is possible to improve capability of displaying a video which has been a flaw of a hold-type displaying.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

As described, a display device of the present invention allows division of an emitting region into smaller regions, irrespective of the smallest module unit of the light source used as a backlight. The display device further minimizes increases in costs for a driving system and manufacturing of the backlight. Therefore, for example, the display device of the present invention is widely applicable to: an image display device such as a television or a monitor; an office appliances such as a word processor or a personal computer; a display device for a video camera, a digital camera, an information terminal such as a mobile phone, or the like.

The invention claimed is:

1. A display device, comprising:
a display panel on which plural unit display pixels are aligned;
an area light source arranged on a back surface of the display panel, the area light source having an emitting region which is divided into plural divided emitting regions; and
a controlling section configured to control luminance of each of the divided emitting regions of the area light source, based on luminance information of a video signal input, the luminances of the divided emitting regions being calculated individually for each of the divided emitting regions based on the luminance information of the video signal input,
the area light source including plural unit emitting pixels, the unit emitting pixels each serving as a unit block formed by (a) plural anode electrodes and (b) plural cathode electrodes intersecting at right angles with the anode electrodes,
the unit emitting pixels being configured to generate light when luminance information of the area light source is input thereto and control light emission of the divided emitting regions through a matrix driving,
the unit emitting pixels each including an electron emitting element configured to emit an electron, and a fluorescent substance which emits light by being excited by the electron emitted from the electron emitting element, and
the unit emitting pixels each occupying an area which is equivalent to an area occupied by plural pixels out of the plural unit display pixels,
wherein each of the divided emitting regions occupy an area which equals an area occupied by plural pixels out of the unit emitting pixels, and
for each divided emitting region, luminances of the plural unit emitting pixels occupying the area of the divided emitting region are controlled as a group, in accordance with the luminance calculated for the divided emitting region based on the luminance information of the video signal input.

2. The display device as set forth in claim 1, wherein the area light source further includes small area light sources each of which is a unit of plural pixels out of the unit emitting pixels, the small area light sources are arranged like tiles.

3. The display device as set forth in claim 1, wherein the electron emitting element includes an emitter layer made of a ferroelectric layer.

4. The display device as set forth in claim 1, wherein the matrix driving is a passive matrix driving.

5. The display device as set forth in claim 1, wherein
the controlling section is configured such that the light emission of the emitting regions is performed line-sequentially in a horizontal scanning direction, in synchronization with driving of the display panel performed line-sequentially in the horizontal scanning direction.

* * * * *